US008672808B2

(12) United States Patent
Nishino et al.

(10) Patent No.: US 8,672,808 B2
(45) Date of Patent: Mar. 18, 2014

(54) BRAKE CONTROL SYSTEM

(75) Inventors: Kimio Nishino, Minami-alps (JP);
Toshiyuki Innami, Mito (JP); Norikazu Matsuzaki, Minami-alps (JP); Shingo Nasu, Hitachinaka (JP); Ayumu Miyajima, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 1232 days.

(21) Appl. No.: 12/512,499

(22) Filed: Jul. 30, 2009

(65) Prior Publication Data
US 2010/0062897 A1 Mar. 11, 2010

(30) Foreign Application Priority Data

Sep. 11, 2008 (JP) .................................. 2008-233768

(51) Int. Cl.
*B60W 10/04* (2006.01)
*B60T 8/34* (2006.01)
(52) U.S. Cl.
USPC ........................................ 477/182; 303/113.1
(58) Field of Classification Search
USPC ........................................ 477/182; 303/113.1
See application file for complete search history.

(56) References Cited

U.S. PATENT DOCUMENTS

| | | | |
|---|---|---|---|
| 5,484,193 A * | 1/1996 | Fuller et al. | 303/115.2 |
| 6,199,670 B1 | 3/2001 | Shirai et al. | |
| 2006/0152080 A1* | 7/2006 | Chico et al. | 303/191 |

FOREIGN PATENT DOCUMENTS

| | | | |
|---|---|---|---|
| EP | 1 679 242 A1 | 7/2006 | |
| JP | 2001-18769 A | 1/2001 | |
| JP | 2002-213507 A | 7/2002 | |
| JP | 2006-193147 A | 7/2006 | |
| JP | 2006-327587 A | 12/2006 | |
| JP | 2007-126032 A | 5/2007 | |
| JP | 2007126032 A * | 5/2007 | .............. B60T 13/74 |

OTHER PUBLICATIONS

Japanese Office Action (Notice of Rejection) dated Aug. 31, 2010 (four (4) pages).
European Search Report dated Nov. 11, 2010 (three (3) pages).

* cited by examiner

*Primary Examiner* — Derek D Knight
(74) *Attorney, Agent, or Firm* — Crowell & Moring LLP

(57) ABSTRACT

Provided is a brake control apparatus for a vehicle which detects an amount of brake-pedal operation by means of an electric signal, and then calculates a braking force demanded by a driver from the electric signal, and thereby generates the demanded braking force. A control mode for a braking force is switched from a normal control mode to a stationary-vehicle control mode, if a determination that the vehicle is in a stationary state is followed by another determination that an electric signal corresponding to an actual braking force exceeds a command value for a stationary-vehicle braking force while the vehicle is in the stationary state. The control mode for a braking force is switched from the stationary-vehicle control mode to the normal control mode, if it is determined that the demanded braking force becomes smaller than the command value for the stationary-vehicle braking force. In addition, in the stationary-vehicle control mode, a braking force generated by a means for braking is equal to the command value for the stationary-vehicle braking force, whereas, in the normal control mode, the braking force generated by the means for braking is equal to the braking force demanded by the driver.

2 Claims, 18 Drawing Sheets

BRAKE CONTROL SYSTEM

BACKGROUND OF THE INVENTION

1. Field of the Invention

The invention relates to a brake control apparatus of a vehicle, and more particularly to a brake control apparatus of a vehicle to electrically control either the electric power or the hydraulic pressure by detecting the amount of brake-pedal operation by means of electric signals, and thus to generate either a braking force or an assisting force corresponding to the amount of brake-pedal operation.

2. Description of the Related Art

In recent years, a variety of brake control apparatuses have been studied in which a braking force demanded by the driver is calculated from electric signals corresponding to the amount of the driver's depressing amount of a brake pedal, and the demanded braking force is generated through electrical control. One of the problems that are common to all these brake control apparatuses is that, when the driver demands, while the vehicle is not moving, a braking force that is larger than necessary to keep the vehicle stationary, an excessive braking force is generated, which in turn results in a wasteful electric-power consumption and heat generation.

Various ways of reducing such wasteful electric power consumption and heat generation have been proposed. For example, according to the method disclosed in JP Published Patent Application No. 2001-18769, when it is determined that the vehicle is stationary, a braking force generated by a means for braking is controlled to the level of a predetermined reference braking force irrespective of the amount of the driver's depressing amount of a brake pedal.

In addition, JP Published Patent Application No. 2002-213507 discloses an electric braking apparatus used for braking the vehicle.

SUMMARY OF THE INVENTION

According to methods of releasing a braking force of the conventional techniques, the braking force is slowly released when the amount of the driver's depressing amount of the brake pedal reaches zero, and then, when the driver depresses the accelerator pedal, the braking force is released rapidly. This configuration brings about a problem that the residual braking force prevents an automatic transmission vehicle from starting smoothly creeping forward in a heavy traffic.

Assume that while the braking force is being reduced slowly but still remains, no sooner a vehicle starts creeping than the driver lightly depresses the brake pedal. In this case, the actual braking force is proportional to the amount of the driver's depressing amount of the brake pedal, and therefore the braking force is smaller than the residual braking force. Accordingly, the driver's braking action may trigger acceleration of the vehicle against what the driver demands. To put it differently, the problem is that, though the driver depresses the brake pedal in order to stop the vehicle, the depressing action may accelerate the vehicle, i.e., a behavior of the vehicle is not in conformity with the driver's intention.

The present invention, therefore, aims to provide a brake control apparatus capable of achieving a reduction in the wasteful electric-power consumption and heat generation while the vehicle is not moving as well as achieving a smooth start. The present invention also aims to provide a brake control apparatus which operates in conformity with the driver's intention at the time of switching between the starting and the stopping of the vehicle.

To solve the above-described problems, an aspect of the invention provides a brake control apparatus for a vehicle configured to detect an amount of brake-pedal operation by means of an electric signal, then to calculate a braking force demanded by a driver from the electric signal, and thereby to generate the demanded braking force. The provided brake control apparatus is characterized in that: a control mode according to which a braking force is generated by the brake control apparatus is switched from a normal control mode to a stationary-vehicle control mode, if a determination that the vehicle is in a stationary state is followed by another determination that an electric signal corresponding to an actual braking force exceeds a command value for a stationary-vehicle braking force to be generated while the vehicle is in the stationary state; and the control mode according to which a braking force is generated by the brake control apparatus is switched from the stationary-vehicle control mode to the normal control mode, if it is determined that the demanded braking force calculated from the amount of the driver's brake-pedal operation becomes smaller than the command value for the stationary-vehicle braking force.

According to the aspect of the invention, the brake control apparatus for a vehicle can achieve a reduction in the wasteful electric-power consumption and heat generation while the vehicle is not moving. In addition, the brake control apparatus can also achieve a smooth start. Furthermore, the brake control apparatus can operate in conformity with the driver's intention at the time of switching between the starting and the stopping of the vehicle.

DESCRIPTION OF THE PREFERRED EMBODIMENTS

Embodiments of the present invention will be described below. The present invention is applicable to several types of brake control systems. Thus, the description starts with various embodiments of the brake control system to which the present invention can be applied.

First Embodiment of Brake Control System

Figure 1:
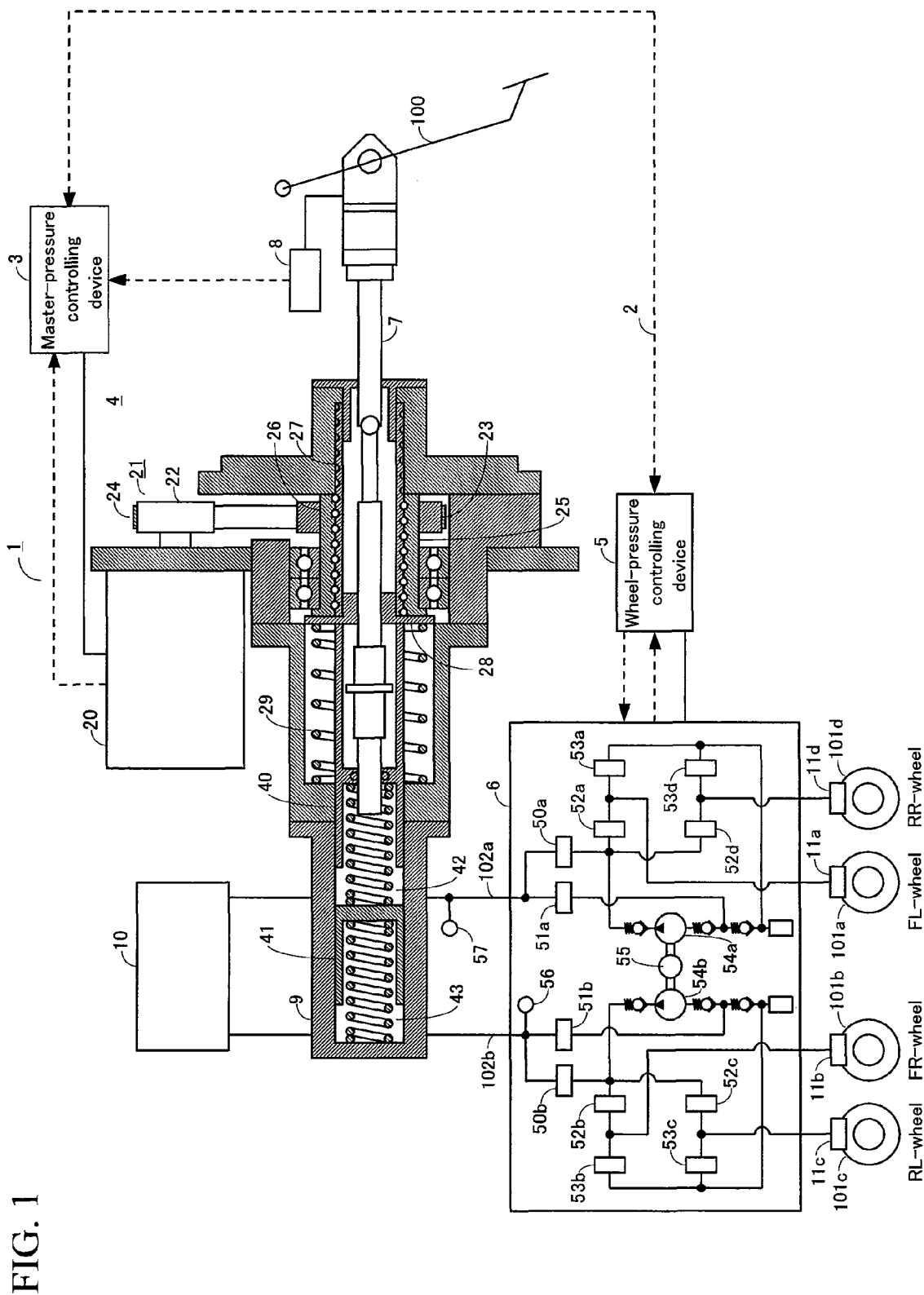
FIG. 1 illustrates an overall configuration of a brake control apparatus according to a first embodiment of the invention.

A first embodiment of a brake control system will be described below. FIG. 1 illustrates an overall configuration of the brake control apparatus. In FIG. 1, the arrowed dash lines represent signal lines, and the arrows indicate the direction in which their respective signals flow.

A brake control system 1 includes a master-cylinder pressure controlling device 3, master-cylinder pressure controlling mechanism 4, a wheel-cylinder pressure controlling device 5, a wheel-cylinder pressure controlling mechanism 6, an input rod 7, a braking operation amount detecting device 8, a master-cylinder 9, a reservoir tank 10, and wheel-cylinders 11a to 11d. A first pressurizing-depressurizing unit includes a brake pedal 100 and the input rod 7 whereas a second pressurizing-depressurizing unit includes the master-cylinder pressure controlling device 3, the master-cylinder pressure controlling mechanism 4, and a primary piston 40.

Two-way communications are allowed between the master-cylinder pressure controlling device 3 and the wheel-cylinder pressure controlling device 5. The master-cylinder pressure controlling device 3 and the wheel-cylinder pressure controlling device 5 share control commands and the parameters representing conditions of the vehicle (yaw rate, longitudinal acceleration, lateral acceleration, steering angle of the steering wheel, speed of each wheel, speed of the vehicle, malfunction information, operation status, and the like).

The master-cylinder pressure controlling device 3 (corresponding to a brake booster) controls a drive motor 20 on the basis of the signals from the braking operation amount detecting device 8, the control commands from the wheel-cylinder pressure controlling device 5, and the like. According to the control commands from the master-cylinder pressure controlling device 3, the master-cylinder pressure controlling mechanism 4 pushes the primary piston 40. The master-cylinder pressure controlling mechanism 4 is constituted of the drive motor 20 to generate a rotational torque, a speed-reduction device 21 to amplify the rotational torque of the drive motor 20, and a rotation-translation converting device 25 to convert the rotational drive to a translational drive.

The wheel-cylinder pressure controlling device 5 (corresponding to an antilock braking system) calculates target braking forces to be generated respectively in the wheels on the basis of the distance from the leading vehicle, information on the road conditions, and the parameters representing the conditions of the vehicle, and controls the wheel-cylinder pressure controlling mechanism 6 on the basis of the calculation result. The wheel-cylinder pressure controlling mechanism 6 controls the supply of brake fluid pressurized by the master-cylinder 9 to the individual wheel-cylinders 11a to 11d, on the basis of the control commands from the wheel-cylinder pressure controlling device 5.

One end of the input rod 7 is connected to the brake pedal 100, while the other end is inserted into a primary fluid chamber 42. This configuration allows the master-cylinder pressure to be increased also by a braking operation of the driver. So, in the event that the drive motor 20 stops, a predetermined braking force can be secured. In addition, a force proportional to the master-cylinder pressure is transmitted through the input rod 7 and is exerted on the brake pedal 100. This force is transmitted, as a brake-pedal reactive force, to the driver. Accordingly, it is no longer necessary to provide any device, such as a spring, for generating the brake-pedal reactive force. As a consequence, the brake control system 1 can have a smaller size and a lighter weight than otherwise, which allows the brake control system 1 to be mounted more easily on the vehicle.

The braking operation amount detecting device 8 is a sensor to detect the braking force demanded by the driver, on the basis of the amount of braking operation. The braking operation amount detecting device 8 includes a combination of plural displacement sensors to detect the amount of displacement of the input rod 7. Here, a physical quantity used as the braking operation amount to be detected by the displacement sensors includes the displacement amount of the input rod 7, the stroke amount of the brake pedal 100, the moving angle of the brake pedal 100, and the depressing force exerted on the brake pedal 100, as well as a combination of these multiple pieces of sensor information.

In addition, the braking operation amount detecting device 8 may include a combination of plural depressing-force sensors each of which detects the depressing force on the brake pedal 100, or may be a combination of a displacement sensor and a depressing-force sensor. Accordingly, even in the event of the cessation of the signals from one of these sensors, the other sensors provide signals that allow the braking demand of the driver to be detected or recognized, thus providing a fail-safe function reliably.

The master-cylinder 9 is a tandem-type master-cylinder that includes two compression chambers: the primary fluid chamber 42 to be compressed by the primary piston 40; and a secondary fluid chamber 43 to be compressed by a secondary piston 41. When the primary piston 40 moves forward, the brake fluid in each compression chamber is pressurized, and the pressurized brake fluid is supplied through a corresponding one of master pipes 102a and 102b to the wheel-cylinder pressure controlling mechanism 6. The reservoir tank 10 is divided by an unillustrated partition wall into at least two fluid chambers. These fluid chambers are communicatively connected to the compression chambers of the master-cylinder 9, respectively.

Each of the wheel-cylinders 11a to 11d includes an unillustrated cylinder, piston, brake pad, and the like. The brake fluid supplied from the wheel-cylinder pressure controlling mechanism 6 makes the piston move forward to press the pad connected to the piston onto a corresponding one of disc rotors 101a to 101d. Since the disc rotors rotate together with their respective wheels, the braking torque acting on each of the disc rotors serves as the braking force acting between each wheel and the road surface. Note that, in FIG. 1, the left front wheel is denoted by FL-wheel; the right front wheel by FR-wheel; the left rear wheel by RL-wheel; and the right rear wheel by RR-wheel.

Next, descriptions will be given as to the configuration and the operation of the master-cylinder pressure controlling mechanism 4. When actuated by an electric power supplied thereto in response to the control command of the master-cylinder pressure controlling device 3, the drive motor 20 generates a desired rotational torque. Any of a DC motor, a DC brushless motor, an AC motor, and the like is suitable and usable as the drive motor 20. A DC brushless motor is preferable for its controllability, quietness, and durability. The drive motor 20 is provided with a position sensor (not illustrated), which generates signals to be inputted into the master-cylinder pressure controlling device 3. So, the master-cylinder pressure controlling device 3 is capable of calculating the rotational angle of the drive motor 20 on the basis of the signals from the position sensor, and capable of calculating the amount of forward movement of the rotation-translation converting device 25, that is, the amount of displacement of the primary piston 40, on the basis of the rotation angle thus calculated.

The speed-reduction device 21 is provided to amplify the rotational torque of the drive motor 20 by a proportion equivalent to the reduction ratio. The reduction in speed may be achieved in several ways, such as using a set of gears, using a pulley mechanism, or the like. The example shown in FIG. 1 employs a pulley mechanism including a drive pulley 22, a driven pulley 33, and a belt 24. If the drive motor 20 generates a rotational torque that is so large that the amplification of the torque is unnecessary, the drive motor 20 may be connected directly to the rotation-translation converting device 25 without the speed-reduction device 21 therebetween. This configuration, if employed, helps to avoid various problems that derive from the interposition of the speed-reduction device 21, i.e., problems related to the reliability, quietness, loadability, and the like of the brake control system 1.

The rotation-translation converting device 25 converts the rotational drive of the drive motor 20 to a translational drive, and thus pushes the primary piston 40. A rack-and-pinion, a ball-screw, or the like is suitable for the conversion mechanism. The example shown in FIG. 1 employs a ball-screw mechanism.

The driven pulley 23 is fitted to an outer circumference of the ball-screw nut 26 of the ball-screw mechanism. Rotation of the driven pulley 23 causes rotation of the ball-screw nut 26, which in turn produces a translational motion of a ball-screw shaft 27 of the ball-screw mechanism. The thrust thus produced pushes the primary piston 40 via a movable member 28.

The movable member 28 engages with an end of a return spring 29 whereas the other end of the return spring 29 is connected to a fixed portion. A force in the opposite direction to the thrust of the ball-screw shaft 27 acts on the ball-screw shaft 27 via the movable member 28. Assume that, during the braking operation, i.e., while the primary piston 40 is being pushed to increase the master-cylinder pressure, the drive motor 20 stops and thus the control to return the ball-screw shaft 27 becomes impossible. Even in this event, the reactive force of the return spring 29 returns the ball-screw shaft 27 back to the initial position, so that the master-cylinder pressure is lowered down to approximately zero. What can be avoided accordingly is unstable behavior of the vehicle that would otherwise be caused by drag of the braking force.

Next, descriptions will be given as to amplification of the thrust of the input rod 7. In the first embodiment, to compress the primary fluid chamber 42, the thrust of the input rod 7 is amplified by displacing the primary piston 40 in accordance with the amount of displacement of the input rod 7 caused by the braking action of the driver. The ratio of amplification (hereinafter, referred to as the "boost ratio") is defined arbitrarily at a certain value by such factors as the ratio of the amount of displacement of the input rod 7 and that of the primary piston 40 as well as the ratio of the cross-sectional area of the input rod 7 and that of the primary piston 40.

In particular, it is a well-known fact that, when the primary piston is to be displaced by an amount that is equal to the amount of displacement of the input rod, the boost ratio is uniquely defined as $(A_{IR}+A_{PP})/A_{IR}$, where "$A_{IR}$" is the cross-sectional area of the input rod and "$A_{PP}$" is the cross-sectional area of the primary piston. To put it differently, if $A_{IR}$ and $A_{PP}$ are determined on the basis of a desired boost ratio and the primary piston 40 is controlled so as to have an amount of displacement that is equal to the amount of displacement of the input rod 7, a certain, constant boost ratio can be obtained. Note that the amount of displacement of the primary piston 40 is calculated by the master-cylinder pressure controlling device 3 on the basis of the signals generated by an unillustrated position sensor.

Next, descriptions will be given as to a process of implementing the variable boost function.

A variable boost control process is defined as a process of control that displaces the primary piston 40 by an amount obtained by multiplying the amount of displacement of the input rod 7 by a proportional gain (K1). Note that a desirable value of K1 is 1 in view of the controllability, but K1 can be temporally changed to a value larger than 1 in the case where a braking force that is larger than the amount of braking operation by the driver is needed, i.e., in the case of emergency braking. Accordingly, since the master-cylinder pressure is increased up to a level that is higher than that of the ordinary setting (when K1=1), a larger braking force than usual can be generated even with the same amount of braking operation by the driver. Note that whether the braking operation is or is not of emergency braking may be determined by, for example, determining whether the time rate of change in the level of the signals from the braking operation amount detecting device 8 is or is not above a predetermined value.

As described above, according to the variable boost control process, the master-cylinder pressure is either increased or decreased in response to the amount of displacement of the input rod 7, which is dependent on the braking demand of the driver. Accordingly, as much braking force as the driver demands can be generated. In addition, changing K1 to a value smaller than 1 allows a hybrid vehicle to employ a hydraulic-regenerative coordination braking control, by which the hydraulic braking force is reduced by an amount equivalent to the regenerative braking force.

Next, descriptions will be given as to a process of implementing an automatic braking function. An automatic braking control process is defined as a process of moving, either forward or backward, the primary piston 40 so that the operation pressure in the master-cylinder 9 can be adjusted to the level of a hydraulic pressure that the automatic braking demands (hereinafter, referred to as the "demanded automatic-brake hydraulic pressure"). Various methods of controlling the primary piston 40 may be employed in this case. Such methods include a method in which, based on the relationship between the amount of displacement of the primary piston 40 and the master-cylinder pressure which is acquired in advance and stored in a table, a target value is set by extracting an appropriate amount of displacement of the primary piston 40 for achieving the demanded automatic-brake hydraulic pressure. In an alternative method, a master-cylinder pressure sensor 57 is provided to detect the master-cylinder pressure and the master-cylinder pressure thus detected is fed back. Note that the demanded automatic-brake hydraulic pressure may be provided by signals sent by an external unit. Such technique is applicable to the braking controls in such controls as the vehicle tracking control, the lane-departure avoidance control, and the obstacle avoidance control.

Next, descriptions will be given as to the configuration and the operation of the wheel-cylinder pressure controlling mechanism 6.

The wheel-cylinder pressure controlling mechanism 6 includes: gate outlet valves 50*a* and 50*b* to control the supply of the brake fluid pressurized in the master-cylinder 9 to the individual wheel-cylinders 11*a* to 11*d*; gate inlet valves 51*a* and 51*b* to control the supply of the brake fluid pressurized in the master-cylinder 9 to pumps 54*a* and 54*b*; inlet valves 52*a* to 52*d* to control the supply of the brake fluid either from the master-cylinder 9 or from the pumps 54*a* and 54*b* to the individual wheel-cylinders 11*a* to 11*d*; outlet valves 53*a* to 53*d* to control the pressure applied to the wheel-cylinders 11*a* to 11*d* by decreasing the pressure; the pumps 54*a* and 54*b* to further increase the operation pressure produced in the master-cylinder 9; a motor 55 to drive the pumps 54*a* and 54*b*; and a master-cylinder pressure sensor 56 to detect the master-cylinder pressure. Note that either a hydraulic control unit for antilock braking control or a hydraulic control unit for vehicle-behavior stabilization control is suitable for the wheel-cylinder pressure controlling mechanism 6.

The wheel-cylinder pressure controlling mechanism 6 includes two brake circuits: a first brake circuit which is supplied with the brake fluid from the primary fluid chamber 42 and which controls the braking force of the FL-wheel and that of the RR-wheel; and a second brake circuit which is supplied with the brake fluid from the secondary fluid chamber 43 and which controls the braking force of the FR-wheel and that of the RL-wheel. Such a configuration guarantees a stable behavior of the vehicle even in the case of malfunction of one of the two brake circuits, because the other, normally-operating one of the two brake circuits can provide the braking force for the corresponding diagonally-positioned wheels.

The gate outlet valves 50*a* and 50*b* are disposed between the master-cylinder 9 and their respective inlet valves 52*a* to 52*d*, and are opened to supply the brake fluid pressurized in the master-cylinder 9 to their respective wheel-cylinders 11*a* to 11*d*. The gate inlet valves 51*a* and 51*b* are disposed between the master-cylinder 9 and their corresponding pumps 54*a* and 54*b*, and are opened to cause the pressure of the brake fluid having been pressurized in the master-cylinder 9 to be further increased by the pumps 54*a* and 54*b* and to be supplied to their corresponding wheel-cylinders 11*a* to 11*d*. The inlet valves 52*a* to 52*d* are provided respectively at positions upstream of the wheel-cylinders 11*a* to 11*d*, and are opened to supply the brake fluid pressurized either in the master-cylinder 9 or the pumps 54*a* and 54*b* to their respective wheel-cylinders 11*a* to 11*d*. The outlet valves 53*a* to 53*d* are provided respectively at positions downstream of the wheel-cylinders 11*a* to 11*d*, and are opened to reduce the pressure applied to their respective wheel-cylinders 11*a* to 11*d*. Note that the gate outlet valves 50*a* and 50*b*, the gate inlet valves 51*a* and 51*b*, the inlet valves 52*a* to 52*d*, and the outlet valves 53*a* to 53*d* are electromagnetic valves, which are opened and closed by energizing their respective solenoids (not illustrated). The amount of opening or closing of each valve is individually adjustable by the current control performed by the wheel-cylinder pressure controlling device 5.

In the first embodiment, the gate outlet valves 50*a* and 50*b*, and the inlet valves 52*a* to 52*d* are normally-open valves whereas the gate inlet valves 51*a* and 51*b*, and the outlet valves 53*a* to 53*d* are normally-closed valve. With this configuration, in the event that the electric-power supply to the valves is ceased due to a malfunction, the gate inlet valves 51*a* and 51*b* and the outlet valves 53*a* to 53*d* remain closed whereas the gate outlet valves 50*a* and 50*b* and the inlet valves 52*a* to 52*d* remain open. The brake fluid pressurized in the master-cylinder 9 can thus reach all the wheel-cylinders 11*a* to 11*d*, so that as much braking force as the driver demands can be generated.

In the case where a pressure that is larger than the operation pressure produced in the master-cylinder 9 is necessary to perform the vehicle-behavior stabilization control, the automatic braking, or the like, the pumps 54*a* and 54*b* further increase the master-cylinder pressure and supply the increased pressure to the wheel-cylinders 11*a* to 11*d*. Plunger pumps, trochoid pumps, gear pumps, or the like is suitable and usable for the pumps 54*a* and 54*b*. Gear pumps are preferable for their quietness.

The motor 55 is actuated by the electric power supplied in response to the control commands of the wheel-cylinder pressure controlling device 5, and drives the pumps 54*a* and 54*b* connected to the motor 55. Any of a DC motor, a DC brushless motor, an AC motor, and the like is suitable and usable for the drive motor 55. A DC brushless motor is preferable for its controllability, quietness, and durability.

The master-cylinder pressure sensor 56 is disposed on the downstream of the secondary-side master pipe 102*b*, and is a pressure sensor to detect the master-cylinder pressure. How many and where master-cylinder pressure sensors 56 to be disposed can be determined as appropriate by taking the controllability, the fail-safe function, and the like into account.

Figure 2:
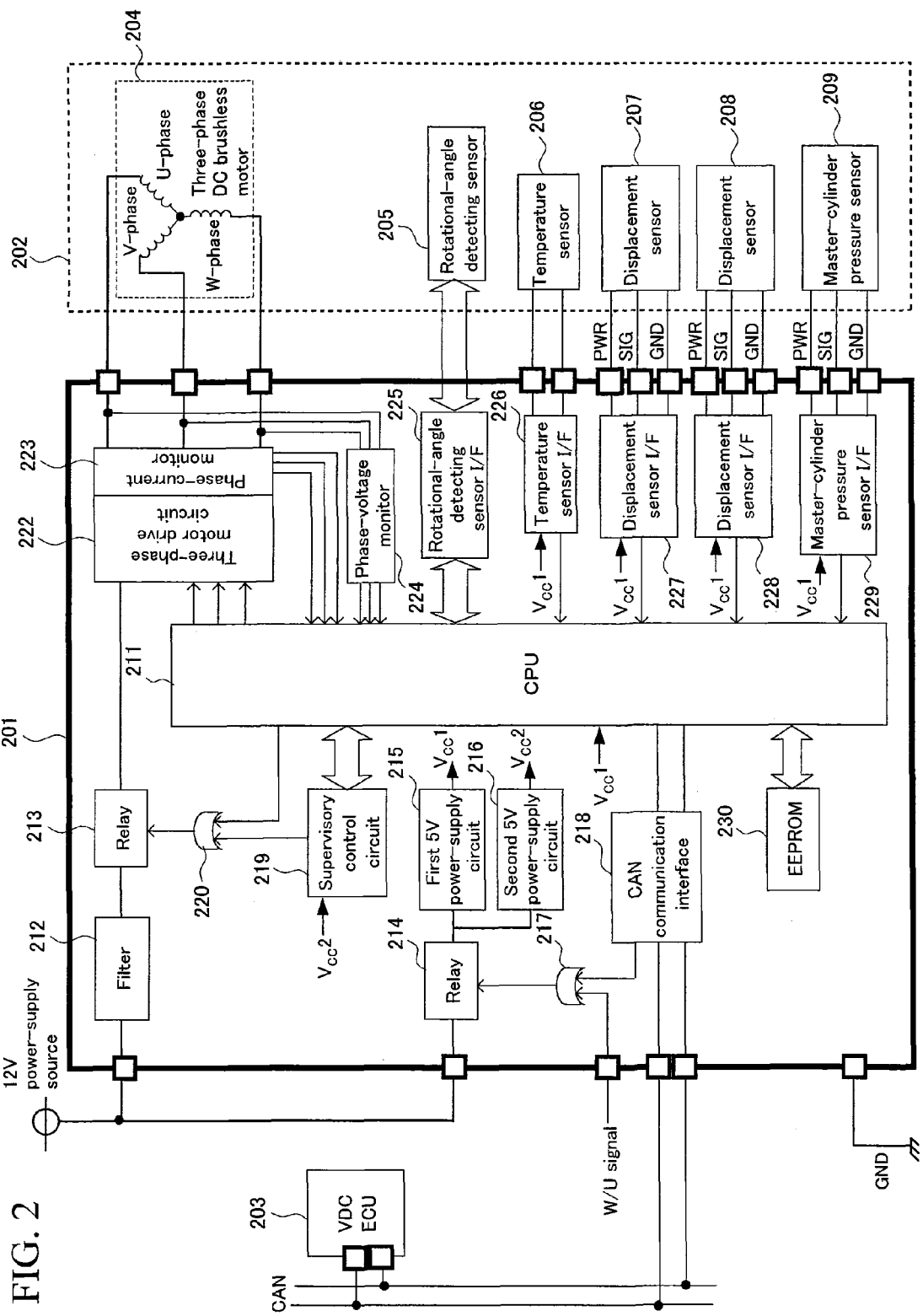
FIG. 2 illustrates a circuit configuration of a master-cylinder pressure controlling device for the brake control apparatus according to the first embodiment of the present invention.

FIG. 2 illustrates an example of a circuit configuration of the master-cylinder pressure controlling device 3 shown in FIG. 1. The circuit of the master-cylinder pressure controlling device 3 is shown within an area demarcated by a thick solid line 201 in FIG. 2. The circuit of the master-cylinder pressure controlling mechanism 4 is shown within an area demarcated by a dotted line 202 in FIG. 2. The area demarcated by a thick solid line 203 in FIG. 2 shows the wheel-cylinder pressure controlling device 5 such as a vehicle dynamics controller (VDC).

Firstly, the electric circuit demarcated by the thick solid line 201 will be described. The electric-power source supplied from the power-supply line in the vehicle via an ECU power-supply relay 214 is inputted into a first 5-V power-supply circuit 1 (215) and a second 5-V power-supply circuit 2 (216). The ECU power-supply relay 214 is turned ON by either a start signal or a start signal generated by a CAN communication I/F 218 in response to a CAN reception. Any of a door switch signal, a brake switch signal, and an IGN switch signal may be used as the start signal. If plural start signals are used, all the signals are taken in the master-cylinder pressure controlling device 3. Then, when any one of the plural switch signals is turned ON, the start signal turns the ECU power-supply relay 214 ON.

The stable power-supply source ($V_{CC}1$) obtained by the 5-V power-supply circuit 1 (215) is supplied to a central control circuit (CPU) 211 whereas the stable power-supply source ($V_{CC}2$) obtained by the 5-V power supply circuit 2 (216) is supplied to a supervisory control circuit 219.

A fail-safe relay circuit 213 is capable of cutting off the power supply from the power-supply line in the vehicle to a three-phase motor drive circuit 222. The allowing of and the cutting-off of the supply of electric power to the three-phase motor drive circuit 222 is controlled by use of the CPU 211 and the supervisory control circuit 219. By passing through a filter circuit 212, noise in the electric power supplied from outside is removed before the electric power is supplied to the three-phase motor drive circuit 222 via the fail-safe relay circuit 213.

The CPU 211 receives, from the outside of the master-cylinder pressure controlling device 3 via a CAN communication I/F circuit 218, vehicle information and the signals for controlling demanded automatic-brake hydraulic pressure and the like. The output of each of a rotational-angle detecting sensor 205, a motor-temperature sensor 206, displacement sensors 207 and 208, and a master-cylinder pressure sensor 209 that are disposed on the side of the master-cylinder pressure controlling mechanism 4, is inputted into the CPU 211 respectively through a rotational-angle detecting sensor I/F circuit 225, a motor-temperature sensor I/F circuit 226, displacement sensor I/F circuits 227 and 228, a master-cylinder pressure sensor I/F circuit 229. Note that in the example shown in FIG. 2, two displacement sensors 207 and 208 are provided, but the number of displacement sensors is not limited to two. The number of displacement sensors may be one, or more than two.

The CPU 211 receives control signals from the external devices and the detected values of the sensors at present. The CPU 211 outputs appropriate signals to the three-phase motor drive circuit 222 on the basis of the signals and values thus received, and thereby controls the master-cylinder pressure controlling device 4. The three-phase motor drive circuit 222 is connected to a motor 204 in the master-cylinder pressure controlling mechanism 4, and is driven in accordance with the control by the CPU 211. In this case, for each phase of the three-phase output of the three-phase motor drive circuit 222, a phase-current monitoring circuit 223 and a phase-voltage monitoring circuit 224 are provided. These circuits 223 and 224 monitor the phase currents and the phase voltages, and, on the basis of the information thus provided, the CPU 211 executes a control to make the three-phase motor drive circuit 222 operate appropriately for making the motor 204 in the master-cylinder pressure controlling mechanism 4 operate appropriately. When, for example, the monitor value in the phase-voltage monitoring circuit 224 is out of the normal range, or when the control is not performed as dictated by the control commands, it is determined that a malfunction has occurred.

The circuit 201 of the master-cylinder pressure controlling device 3 includes a memory circuit 230 made of an EEPROM in which the information on malfunction and the like are stored. Signals are exchanged between the memory circuit 230 and the CPU 211. The CPU 211 stores, in the memory circuit 230, the detected information on malfunction, the learned values, such as the control gain, the offset values of the sensors to be used for controlling the master-cylinder pressure controlling mechanism 4, and the like. In addition, the circuit 201 of the master-cylinder pressure controlling device 3 includes the supervisory control circuit 219. Signals are exchanged between the CPU 211 and the supervisory control circuit 219. The supervisory control circuit 219 monitors the occurrence of a malfunction of the CPU 211, the $V_{CC}1$ voltage and the like. When detecting abnormality of the CPU 211, the $V_{CC}1$ voltage, or the like, the supervisory control circuit 219 immediately actuates the fail-safe relay circuit 213 so as to cut off the power supply to the three-phase motor drive circuit 222. Note that both the supervisory control circuit 219 and the $V_{CC}2$ voltage are monitored by the CPU 211.

In a case of malfunction of the master-cylinder pressure controlling device 3, the amount of braking operation by the driver is detected on the basis of the pressure of the brake fluid detected by the master-cylinder pressure sensor 56, and then the wheel-cylinder pressure controlling device 5 controls the pumps 54b and 54 and the like, so that a wheel-cylinder pressure is generated on the basis of the detected value.

The descriptions given thus far are based on a brake control system equipped with an electric booster device. Nonetheless, even if the brake system is not equipped with such an electric booster device, the master-cylinder pressure sensor 56 can detect the amount of braking operation by the driver, and a wheel-cylinder pressure can be generated on the basis of the detected values.

Second Embodiment of Brake Control System

Figure 3:
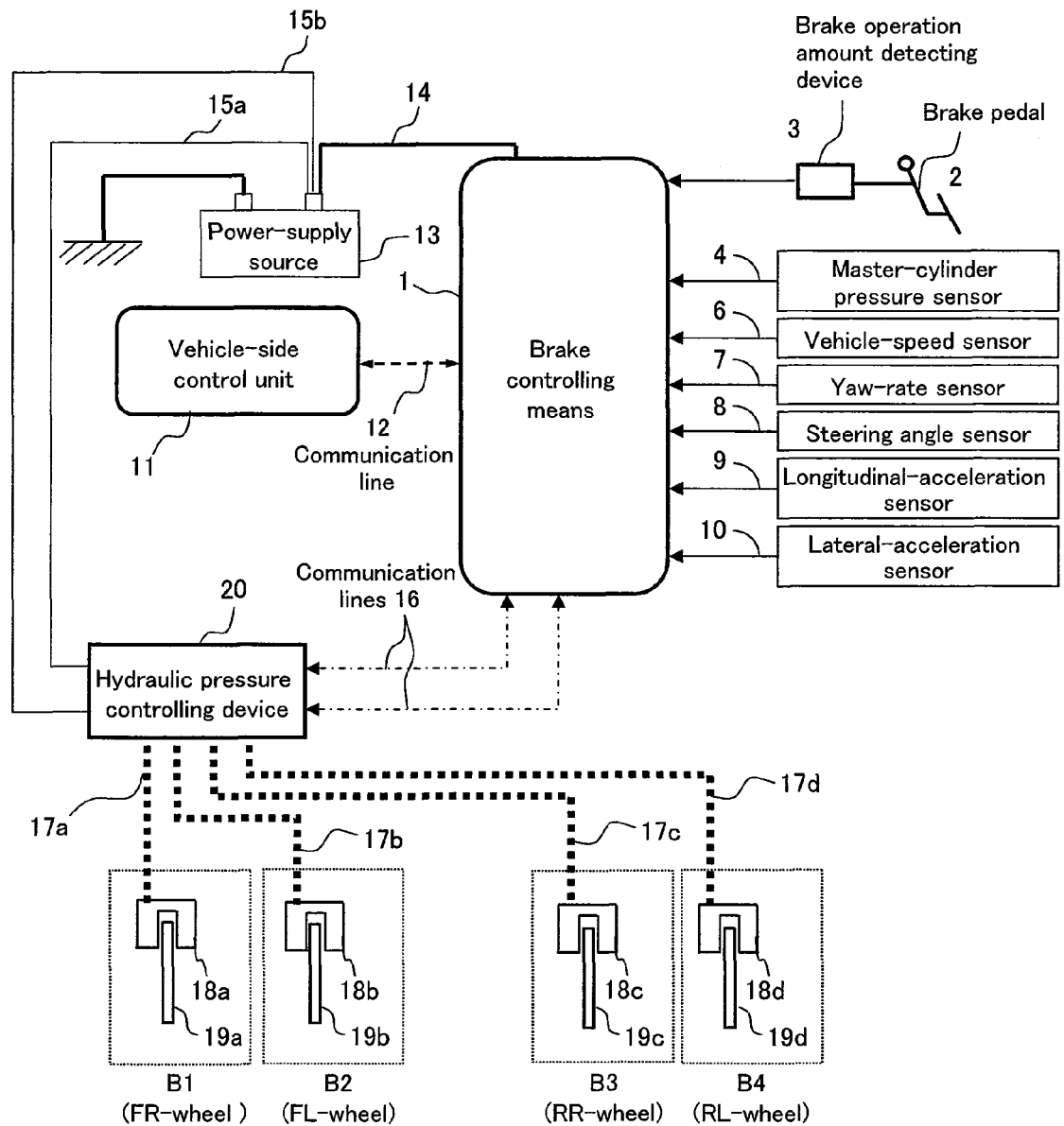
FIG. 3 illustrates a system configuration of an electric hydraulic brake control apparatus according to a second embodiment of the present invention.

A second embodiment of the electric hydraulic brake control system for a vehicle of the present invention will be described by referring to FIGS. 3 to 5. FIG. 3 illustrates a system configuration of the electric hydraulic-brake control system including a means 1 for controlling brakes, a hydraulic-pressure controlling device 20, and signal lines (communication lines) and electric-power lines that connect the above-mentioned members.

The means 1 for controlling brakes receives various kinds of sensor information transmitted from such sensors as: a braking operation amount detecting device 3 to detect the amount of the driver's operation on a brake pedal 2; a master-cylinder pressure sensor 4; vehicle-speed sensors 6 to detect the speed of their respective wheels of the vehicle (i.e., the speed of each of the four wheels in total—a right-and-left pair of front wheels and a right-and-left pair of rear wheels); a yaw-rate sensor 7 to detect the yaw rate of the vehicle; a steering-angle sensor 8 to detect the steering angle of the vehicle; a longitudinal-acceleration sensor 9 to detect the acceleration in the front-to-rear direction of the vehicle; and a lateral-acceleration sensor 10 to detect the acceleration in the side-to-side direction of the vehicle. The brake pedal 2 is described above as an example of means for inputting the driver's braking operation. The brake pedal 2 is not the only inputting means. Other means such as a joy stick may be used, instead.

In addition, the braking operation amount detecting device 3 may include a force sensor to detect the force exerted on the brake pedal 2 and/or a stroke sensor to detect the moving distance of the brake pedal 2. Alternatively, the master-cylinder pressure sensor 4 may be used also for this purpose.

The means 1 for controlling brakes is connected to a communication line 12, so that the means 1 for controlling brakes can exchange information, if necessary, with other control units mounted on the vehicle. A CAN or the like is a possible means for implementing the function of the communication line 12. In addition, the means 1 for controlling brakes is connected to the hydraulic-pressure controlling device 20 by means of communication lines 16. The information exchanged via the communication lines 16 are the information, for example, on: either the target hydraulic pressure or the target braking force to be generated in each of the FR-wheel, the FL-wheel, the RR-wheel, and the RL-wheel; the actual hydraulic pressure or the braking force generated actually; the state of the hydraulic pressure control; and the malfunction state. Accordingly, if only a single system of communication lines 16 is provided and a disconnection of the only system of the communication lines 16 occurs, the continuing of the by-wire control becomes difficult. For this reason, plural systems of the communication lines 16 are generally provided (i.e., the communication lines 16 are made redundant). The communication lines 16 are also implemented by a CAN or the like.

The hydraulic-pressure controlling device 20 controls the hydraulic pressure to be supplied to each of the pipes 17a to 17d disposed to respectively reach brake calipers 18a to 18d of the wheels. The hydraulic-pressure controlling device 20 includes pumps, solenoid valves, hydraulic-pressure sensors, and the like. Detailed descriptions of the hydraulic-pressure controlling device 20 will be given later by referring to FIG. 5. The hydraulic-pressure controlling device 20 actuates the pumps and the solenoid valves, and thus controls individually the hydraulic pressure to be supplied to each wheel so that either the target hydraulic pressure or the target braking force of each wheel, which is transmitted via the communication lines 16, can be achieved. A common way of controlling the hydraulic pressure for each wheel is to detect, by use of hydraulic-pressure sensors, the hydraulic pressure in the pipes 17a to 17d that are connected to their respective wheels, and then to subject the hydraulic pressure to a feed-back control based on the hydraulic-pressure values thus detected. In addition, electric-power lines 15a and 15b are connected to the hydraulic-pressure controlling device 20 so as to supply electric power to the hydraulic-pressure controlling device 20.

Each of braking-force generating devices B1 to B4 of the wheels includes: a corresponding one of members to be braked 19a to 19d; a corresponding one of braking members (not illustrated); and a corresponding one of the brake calipers 18a to 18d. The members to be braked 19a to 19d are attached to their respective wheels located near the four corners of the vehicle body, i.e., a right front (FR) wheel, a left front (FL) wheel, a right rear (RR) wheel, and a left rear (RF) wheel, and rotate together with the wheels. The brake calipers 18a to 18d press the braking members onto the members to be braked 19a to 19d, respectively. Brake discs and brake drums are some examples of the members to be braked 19a to 19d. Brake pads and brake shoes are some examples of the braking members. The forces to press the braking members onto the members to be braked 19a to 19d are generated by transmitting the hydraulic pressure produced in the hydraulic-pressure controlling device 20 to the brake calipers 18a to 18d via their respective pipes 17a to 17d. To generate the braking forces in the four wheels of the vehicle, the braking-force generating apparatuses B1 to B4 use above-mentioned force to press the wheel-cylinders of the brake calipers 18a to 18d onto the members to be braked 19a to 19d (the force will be referred to as the "wheel-cylinder pressure").

Figure 4:
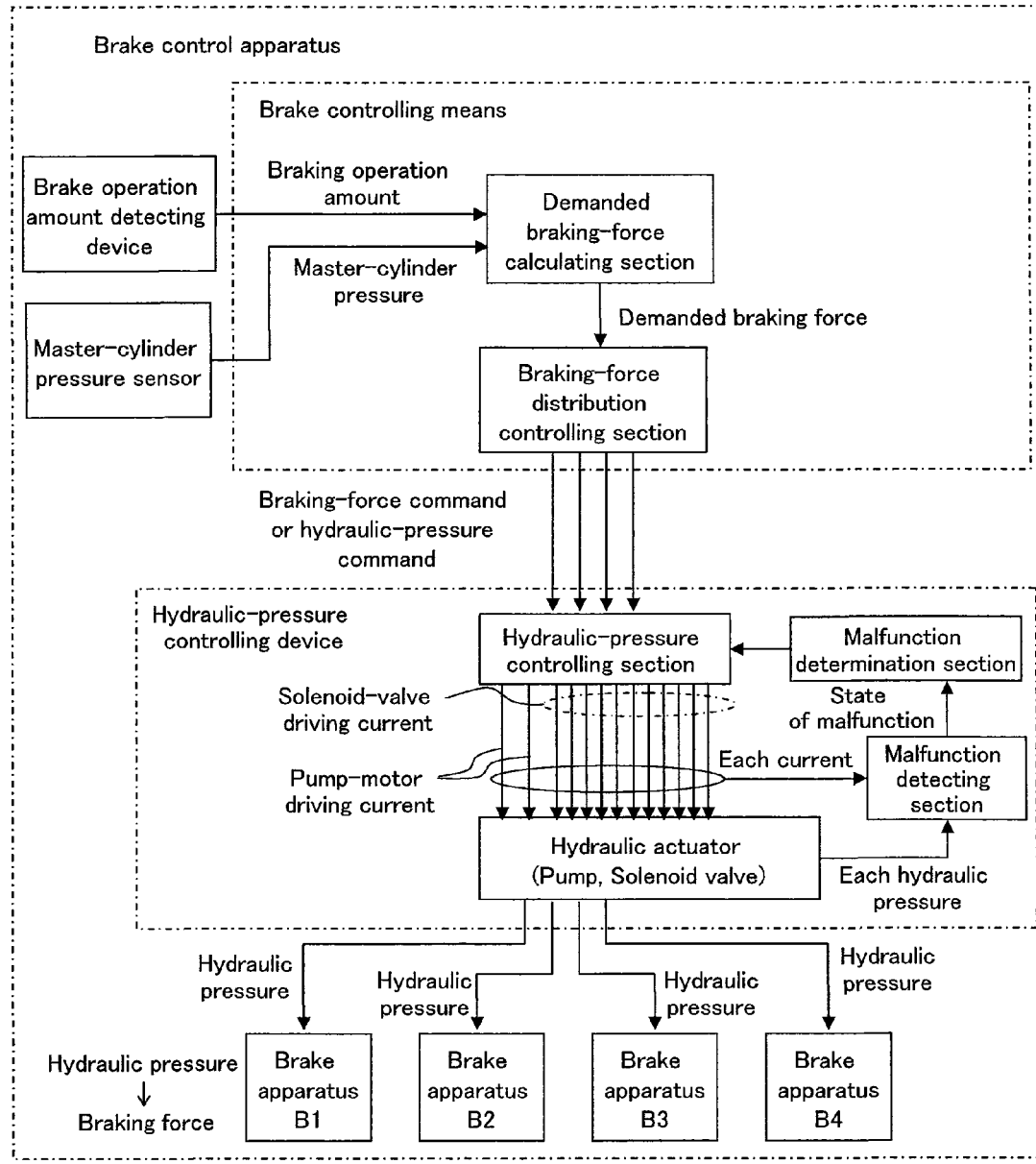
FIG. 4 is a block diagram illustrating a control flow of the brake control apparatus according to the second embodiment of the present invention.

FIG. 4 is a block diagram illustrating a control flow of the brake control apparatus according to the second embodiment. To begin with, a demanded-braking force calculating section of the means for controlling brakes calculates the braking force demanded by the driver, on the basis of either the braking operation amount detected by the braking operation amount detecting device 3 or the master-cylinder pressure. Then, on the basis of the demanded braking force thus calculated, a braking-force distribution controlling section calculates either the target braking force to be generated in each wheel or the target brake-fluid pressure for each wheel. Alternatively, the target braking force to be generated in each wheel or the target brake-fluid pressure for each wheel may be calculated on the basis of at least one of: the demanded braking force; the behavior of the vehicle determined on the basis of various kinds of information acquired by the sensors; and the braking-force demands transmitted, via the communication line 12, from other control units mounted on the vehicle. Some examples of these sensors are: the vehicle-speed sensors 6 to detect the speed of their respective wheels of the vehicle (i.e., the speed of each of the four wheels in total—the right-and-left pair of front wheels and the right-and-left pair of rear wheels); the yaw-rate sensor 7 to detect the yaw rate of the vehicle; the steering-angle sensor 8 to detect the steering angle of the vehicle; the longitudinal-acceleration sensor 9 to detect the acceleration in the front-to-rear direction of the vehicle; and the lateral-acceleration sensor 10 to detect the acceleration in the side-to-side direction of the vehicle.

Subsequently, a malfunction detecting section of a hydraulic-pressure controlling device determines whether or not there is a malfunction by referring the driving current for the pump motors, the driving current for the solenoid valves, the hydraulic pressure for each wheel-cylinder, and the like. The malfunction detecting section determines that a malfunction has occurred, when the reference values continue to stay out of their respective predetermined proper ranges for a predetermined length of time or longer, or when the differences between those reference values and their respective target values continue to be equal to or more than a predetermined value for a predetermined length of time or longer. For example, the occurrence of a malfunction that prevents the pump motors from being driven normally is detected when the driving current for the pump motors continues to be out of the predetermined proper range for a predetermined length of time or longer or when the difference between the driving current for the pump motors and its target value continues to be equal to or larger than a predetermined value for a predetermined length of time or longer.

In an alternative configuration, to directly detect various kinds of malfunctioning, the information from various voltage detecting sections and various current detecting sections may be inputted into the malfunction detecting section. For example, the malfunction detecting section detects: a high-voltage short caused by the connection to the power-supply source, a ground short caused by the connection to the ground, or a disconnection of the communication lines 16 illustrated in FIG. 3; a disconnection of the electric-power line 15a or 15b, or a voltage out of the predetermined proper range applied to the electric-power line 15a or 15b; a voltage drop of a power-supply source 13; a malfunction within the hydraulic-pressure controlling device due to other malfunctions or the like; and a malfunction that occurs around the hydraulic-pressure controlling device, such as a malfunction of the harness. To accomplish the detection, the malfunction detecting section refers to the values transmitted from the voltage detecting sections. If one of the reference values continues to be out of its predetermined proper range of values for a predetermined length of time or longer, the malfunction detecting section detects the occurrence of a malfunction in the portion corresponding to the above-mentioned one of the reference values. In addition, to detect the CPU itself, the CPU is diagnosed by use of a monitoring IC. The processes executed by other members than the CPU—such as the above-mentioned diagnosis—may be included in the processes that the malfunction detecting section executes. In addition, the malfunction diagnosis of the monitoring IC, the malfunction diagnosis of the communication data of the communication lines 16, and the like may be executed by the malfunction detecting section.

On the basis of the malfunction condition detected by the malfunction detecting section, a malfunction determination section of the hydraulic-pressure controlling device makes determination as to the switching of the control modes of the by-wire control and determination as to the transition to the mechanical back-up braking mode in which the driver's operation on the brake pedal directly makes either the braking-force generating devices B1 and B2 or the braking-force generating devices B1 to B4 generate braking forces.

A fluid-pressure controlling section of the hydraulic-pressure controlling device controls the hydraulic pressure to be generated in each wheel, on the basis of the target braking force or the target hydraulic pressure, and controls the hydraulic pressure according to the control mode selected on the basis of the determination results of the malfunction determination section.

Figure 5:
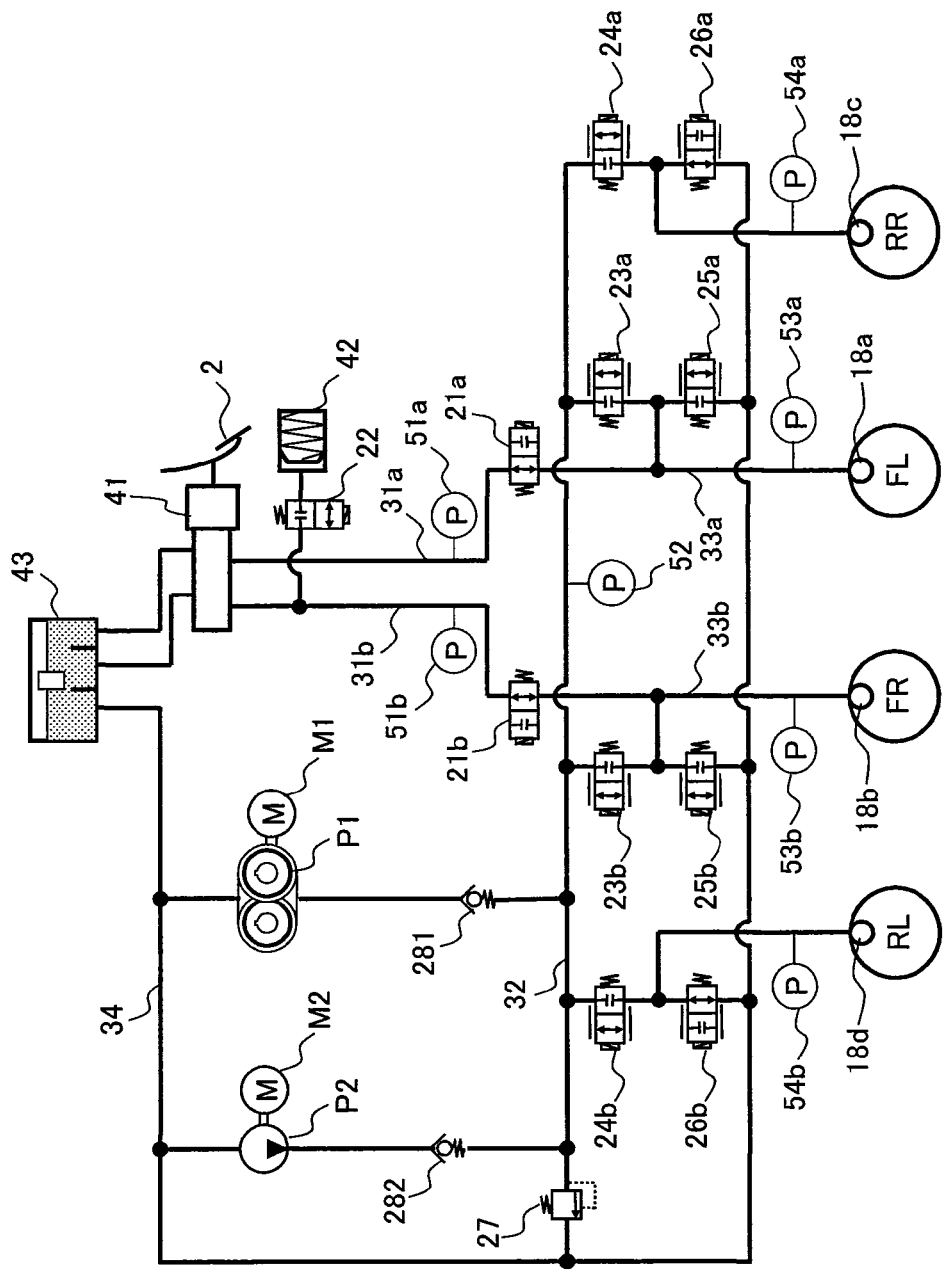
FIG. 5 schematically illustrates a hydraulic circuit of a brake control system according to the second embodiment of the present invention.

FIG. 5 schematically illustrates a hydraulic circuit of the brake control system according to the second embodiment. Firstly, the configuration of the hydraulic circuit will be described. A master-cylinder 41 is what is known as a tandem-type cylinder. The master-cylinder 41 is capable of supplying a hydraulic pressure independently to a P system that reaches the wheels via an oil passage 31a, and an S system that reaches the wheels via an oil passage 31b. A reservoir 43 for storing the brake fluid is connected to the master-cylinder 41. The wheel-cylinder 18a of the FL-wheel and the wheel-cylinder 18b of the FR-wheel are connected respectively to the P-system including the oil passage 31a and the S-system including the oil passage 31b. A shutoff valve 21a is provided between the oil passage 31a and the wheel-cylinder 18a of the FL-wheel whereas a shutoff valve 21b is provided between the oil passage 31b and the wheel-cylinder 18b of the FR-wheel. These shutoff valves 21a and 21b are normally-open electromagnetic valves, and allow or block the communication between the master-cylinder 41 and their respective wheel-cylinders 18a and 18b.

During the by-wire control, the side of the master-cylinder 41 can be isolated from both the side of the wheel-cylinder 18a of the FL-wheel and the side of the wheel-cylinder 18b of the FR-wheel by energizing and thus closing the shutoff valves 21a and 21b. Accordingly, when a malfunction that makes the by-wire control impossible occurs, the supply of electric power to the shutoff valves 21a and 21b is cut off and thus the shutoff valves 21a and 21b are opened. Consequently, the hydraulic pressure in the master-cylinder 41 can be supplied to the wheel-cylinder 18a of the FL-wheel and the wheel-cylinder 18b of the FR-wheel.

A stroke simulator 42 is connected to the oil passage 31b that connects the master-cylinder 41 and the shutoff valve 21b. The stroke simulator 42 secures the stroke of the brake pedal 2 during the by-wire control so that the driver can feel the movement of the brake pedal 2. In addition, a switching valve 22 is provided between the stroke simulator 42 and the oil passage 31b. This switching valve 22 is a normally-closed electromagnetic valve. During the transition to the mechanical back-up brake mode, the switching valve 22 is not energized and is thus closed. Accordingly, the hydraulic pressure in the oil passage 31b is prevented from being supplied to the stroke simulator 42.

The outlet side of each of the pumps P1 and P2 is connected to the wheel-cylinders 18a to 18d of the FL-wheel, the FR-wheel, the RR-wheel, and the RL-wheel via an oil passage 32. Each of inlet valves 23a, 23b, 24a, and 24b is provided between the oil passage 32 and the corresponding one of the wheel-cylinders 18a to 18d. The inlet valves 23a, 23b, 24a, and 24b are normally-closed proportional valves, and proportionally control the discharging pressure of the pumps P1 and P2 so as to individually control the hydraulic pressure in the wheel-cylinders 18a to 18d of the FL-wheel, the FR-wheel, the RR-wheel, and the RL-wheel. The inlet valves 23a to 23d, which are normally-closed valves, prevent the discharging pressure of the pumps PI and P2 from leaking out to the wheel-cylinder side when a malfunction occurs.

The inlet side of each of the pumps P1 and P2 is connected to the reservoir 43 via an oil passage 34. Each of outlet valves 25a, 25b, 26a, and 26b is provided between the oil passage 34 and the corresponding one of the wheel-cylinders 18a to 18d of the FR-wheel, the FL-wheel, the RR-wheel, and the RL-wheel. The outlet valves 25a and 25b are normally-closed proportional valves whereas the outlet valves 26a and 26b are normally-open proportional valves. A relief valve 27 is provided between the oil passage 32 and the oil passage 34. The relief valve 27 is opened when the discharging pressure of the pumps P1 and P2 becomes equal to or higher than a predetermined value, and thus the hydraulic pressure in the oil passage 32 circulates back to the reservoir 43. In addition, master-cylinder pressure sensors 51a and 51b are provided to monitor the hydraulic pressure in the P system in which the brake fluid is supplied from the master-cylinder 41 via the oil passage 31a and the hydraulic pressure in the S-system in which the brake fluid is supplied from the master-cylinder 41 via the oil passage 31b. In addition, a pump discharging-pressure sensor 52 is provided to monitor the discharging pressure of the pumps P1 and P2 and to monitor the hydraulic pressure in the oil passage 32. Moreover, wheel-cylinder pressure sensors 53a, 53b, 54a, and 54b are provided to respectively monitor the hydraulic pressure in the wheel-cylinders 18a to 18d of the FL-wheel, FR-wheel, RR-wheel, and the RL-wheel.

Next, the brake-by-wire control will be described. During the brake-by-wire control, firstly, the shutoff valve 21a is energized and is thus closed so as to isolate the oil passage 31a from the oil passage 31a of the P-system whereas the shutoff valve 21b is energized and is thus closed so as to isolate the oil passage 31b from the oil passage 33 of the S-system. In addition, the communication between the oil passage 31b and the stroke simulator 42 is allowed by opening the switching valve 22. Accordingly, the brake fluid discharged from the master-cylinder 41 can be absorbed by the stroke simulator 42.

During the brake-by-wire control, an increase in the pressure of the brake fluid is achieved in the following way. Firstly, a first motor M1 is driven with the inlet valves 23a, 23b, 24a, and 24b being opened and the outlet valves 25a, 25b, 26a, and 26b being closed. Then, the first motor M1 drives a first pump P1. The brake fluid with the increased pressure is introduced into the wheel-cylinders 18a to 18d of the FL-wheel, the FR-wheel, the RR-wheel, and the RL-wheel via the oil passage 32 and their respective inlet valves 23a to 23d. The pressure of the brake fluid having thus introduced is further increased. The increasing of the pressure described above is a "pump-up method" in which, by controlling the driving of the pumps, the discharging pressure of the pumps is introduced into the wheel-cylinders 18a to 18d via the inlet valves 23a, 23b, 24a, and 24b, so as to increase individually the wheel-cylinder pressure in each wheel.

A decrease in the pressure of the brake fluid is achieved in the following way. Firstly, the inlet valves 23a, 23b, 24a, and 24b are closed whereas the outlet valves 25a, 25b, 26a, and 26b are opened. Thus the brake fluid in the wheel-cylinders 18a to 18d of the FL-wheel, the FR-wheel, the RR-wheel, and the RL-wheel is discharged out to the reservoir 43. In addition, when the brake is maintained, the inlet valves 23a, 23b, 24a, and 24b and the outlet valves 25a, 25b, 26a, and 26b are closed so as to maintain the wheel-cylinder pressure.

Third Embodiment of Brake Control System

Next, a third embodiment of the brake control system will be described. The system of the third embodiment has a configuration that is basically the same as that of the second embodiment, except for the configuration of the source of hydraulic pressure.

Figure 6:
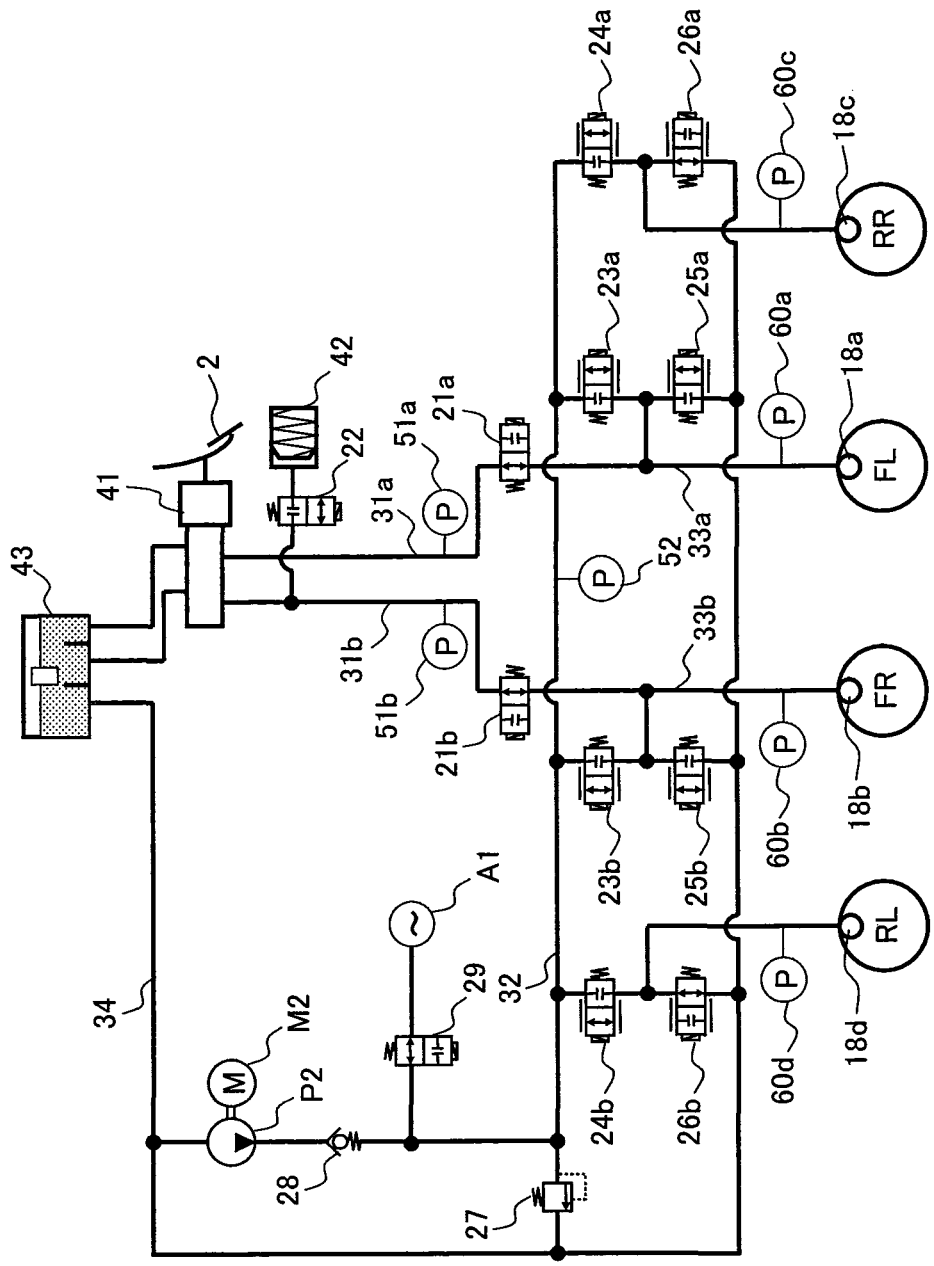
FIG. 6 schematically illustrates a hydraulic circuit of a brake control system according to a third embodiment of the present invention.

FIG. 6 schematically illustrates a hydraulic circuit of the brake control system according to the third embodiment. Firstly, the configuration of the hydraulic circuit will be described. The master-cylinder 41 is what is known as a tandem-type cylinder. The master-cylinder 41 is capable of supplying the same hydraulic pressure independently to the P system that reaches the wheels via the oil passage 31a, and the S system that reaches the wheels via the oil passage 31b. The reservoir 43 for storing the brake fluid is connected to the master-cylinder 41.

The wheel-cylinder 18a of the FL-wheel and the wheel-cylinder 18b of the FR-wheel are connected respectively to the oil passage 31a of the P-system and the oil passage 31b of the S-system. The shutoff valve 21a is provided between the oil passage 31a and the wheel-cylinder 18a of the FL-wheel whereas the shutoff valve 21b is provided between the oil passage 31b and the wheel-cylinder 18b of the FR-wheel. The shutoff valves 21a and 21b are normally-open electromagnetic valves, and allow or block the communication between the master-cylinder 41 and their respective the wheel-cylinders 18a and 18b of the FL-wheel and FR-wheel. With this circuit configuration, during the by-wire control, the side of the master-cylinder 41 can be isolated from both the side of the wheel-cylinder 18a of the FL-wheel and the side of the wheel-cylinder 18b of the FR-wheel by energizing and thus closing the shutoff valves 21a and 21b. Accordingly, when a malfunction that makes the by-wire control impossible occurs, the supply of electric power to the shutoff valves 21a and 21b is cut off and thus the shutoff valves 21a and 21b are opened. Consequently, the hydraulic pressure in the master-cylinder 41 can be supplied to the wheel-cylinder 18a of the FL-wheel and the wheel-cylinder 18b of the FR-wheel.

The stroke simulator 42 is connected to the oil passage 31b that connects the master-cylinder 41 and the shutoff valve 21b. The stroke simulator 42 secures the stroke of the brake pedal 2 during the by-wire control so that the driver can feel the movement of the brake pedal 2. In addition, the switching valve 22 is provided between the oil passage 31b and the stroke simulator 42. This switching valve 22 is a normally-closed electromagnetic valve. During the transition to the mechanical back-up brake mode, the switching valve 22 is not energized and is thus closed. Accordingly, the hydraulic pressure in the oil passage 31b is prevented from being supplied to the stroke simulator 42.

A switching valve 29 is provided between an accumulator A1 and the pump P2. The switching valve 29 is a normally-open electromagnetic valve. When the switching valve 29 is energized, the accumulator A1 is isolated from the oil passage connected to the outlet side of the pump P2. The outlet side of the pump P2 is connected to the wheel-cylinders 18a to 18d of the FL-wheel, the FR-wheel, the RR-wheel, and the RL-wheel through the oil passage 32. The inlet valves 23a, 23b, 24a, and 24b are provided between the oil passage 32 and their respective wheel-cylinders 18a to 18d of the FL-wheel, the FR-wheel, the RR-wheel, and the RL-wheel.

The inlet valves 23a, 23b, 24a, and 24b are normally-closed proportional valves, and proportionally control the discharging pressure of the accumulator A1 or the pump P2 so as to individually control the hydraulic pressure in the wheel-cylinders 18a to 18d of the FL-wheel, the FR-wheel, the RR-wheel, and the RL-wheel. The inlet valves 23a to 23d, which are normally-closed valves, prevent the discharging pressure of the accumulator A1 or the pump P2 from leaking out to the wheel-cylinder side when a malfunction occurs.

The inlet side of the pump P2 is connected to the reservoir 43 via the oil passage 34. Each of the outlet valves 25a, 25b, 26a, and 26b is provided between the oil passage 34 and the corresponding one of the wheel-cylinders 18a to 18d of the FR-wheel, the FL-wheel, the RR-wheel, and the RL-wheel. The outlet valves 25a and 25b are normally-closed proportional valves whereas the outlet valves 26a and 26b are normally-open proportional valves. The relief valve 27 is provided between the oil passage 32 and the oil passage 34. The relief valve 27 is opened when the discharging pressure of the accumulator A1 or the pump P2 becomes equal to or higher than a predetermined value, and thus the hydraulic pressure in the oil passage 32 circulates back to the reservoir 43.

In addition, the master-cylinder pressure sensors 51a and 51b are provided to respectively monitor the hydraulic pressure in the oil passage 31a of the P system and in the oil passage 31b of the S-system. In addition, the pump discharging-pressure sensor 52 is provided to monitor the discharging pressure of the accumulator A1 or the pump P2 and to monitor the hydraulic pressure in the oil passage 32. Moreover, wheel-cylinder pressure sensors 60a, 60b, 60c, and 60d are provided to monitor the hydraulic pressure in the wheel-cylinders 18a to 18d of their respective FL-wheel, FR-wheel, RR-wheel, and the RL-wheel.

Next, the brake-by-wire control will be described. During the brake-by-wire control, firstly, the shutoff valves 21a and 21b are closed so that the master-cylinder 41 is isolated from the wheel-cylinder 18a of the FL-wheel and from the wheel-cylinder 18b of the FR-wheel. During the brake-by-wire control, an increase in the hydraulic pressure is achieved in the following way. Firstly, while the outlet valves 25a, 25b, 26a, and 26b are closed, the opening degree of each of the inlet valves 23a, 23b, 24a, and 24b are adjusted. Here, the accumulator A1 is used as the source of the hydraulic pressure. The brake fluid that is pressurized in the accumulator A1 passes through the oil passage 32, and is then adjusted in terms of its hydraulic pressure. The resultant brake fluid is introduced into the wheel-cylinders 18a to 18d of the FL-wheel, the FR-wheel, the RR-wheel, and the RL-wheel so as to accomplish the increase in the hydraulic pressure.

A decrease in the hydraulic pressure is achieved in the following way. Firstly, the inlet valves 23a, 23b, 24a, and 24b are closed whereas the outlet valves 25a, 25b, 26a, and 26b are opened. Thus the brake fluid in the wheel-cylinders 18a to 18d of the FL-wheel, the FR-wheel, the RR-wheel, and the RL-wheel is discharged out to the reservoir 43. In addition, when the brake is maintained, the inlet valves 23a, 23b, 24a, and 24b and the outlet valves 25a, 25b, 26a, and 26b are closed so as to maintain the wheel-cylinder pressure.

Fourth Embodiment of Brake Control System

Figure 7:
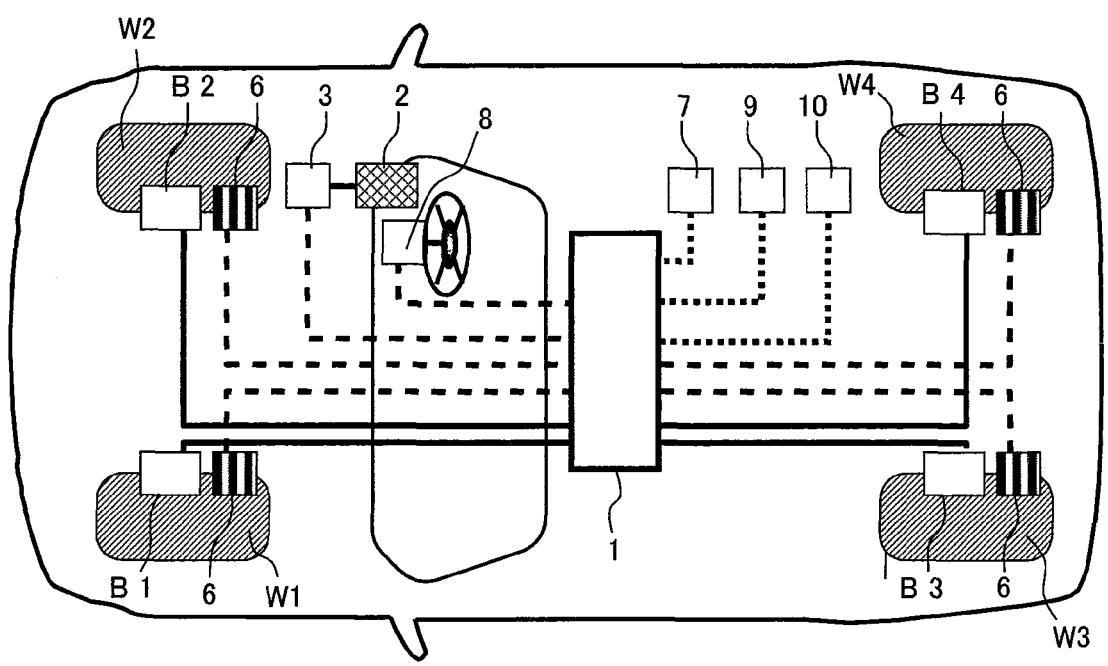
FIG. 7 schematically illustrates a vehicle equipped with a brake control apparatus configured to control plural electric braking apparatuses according to a fourth embodiment of the present invention.

Next, an electric brake control system will be described as a fourth embodiment of the brake control system. FIG. 7 schematically illustrates a vehicle equipped with a brake control apparatus configured to control plural electric braking apparatuses. Electric brake units B1 to B4 are respectively fitted to wheels W1 to W4 of the vehicle, and are configured to generate braking forces in their respective wheels W1 to W4 in response to control signals transmitted from a brake control apparatus 1.

A braking operation amount detecting device 3 is provided to detect the amount of the driver's operation on a brake pedal 2. The brake control apparatus 1 receives, from the braking operation amount detecting device 3, signals representing of the distance by which the brake pedal 2 is depressed by the driver, and then, on the basis of the received signals, calculates the braking forces corresponding to the distance. Then, to achieve the braking forces, the brake control apparatus 1 outputs control signals to the electric brake units B1 to B4 of their respective wheels W1 to W4. According to the control signals from the brake control apparatus 1, the electric brake units B1 to B4 generate braking forces in the wheels W1 to W4. The brake pedal 2 is described above as an example of means for inputting the driver's braking operation. The brake pedal 2 is not the only inputting means. Other means such as a joy stick may be used, instead. In addition, as the braking operation amount detecting device 3, any one of or both of a force sensor and a stroke sensor may be used.

In addition, the brake control apparatus 1 receives signals from: vehicle-speed sensors 6 to detect the speed of their respective wheels of the vehicle; a yaw-rate sensor 7 to detect the yaw rate of the vehicle; a steering-angle sensor 8 to detect the steering angle of the vehicle; a longitudinal-acceleration sensor 9 to detect the acceleration in the front-to-rear direction of the vehicle; and a lateral-acceleration sensor 10 to detect the acceleration in the side-to-side direction of the vehicle.

Figure 8:
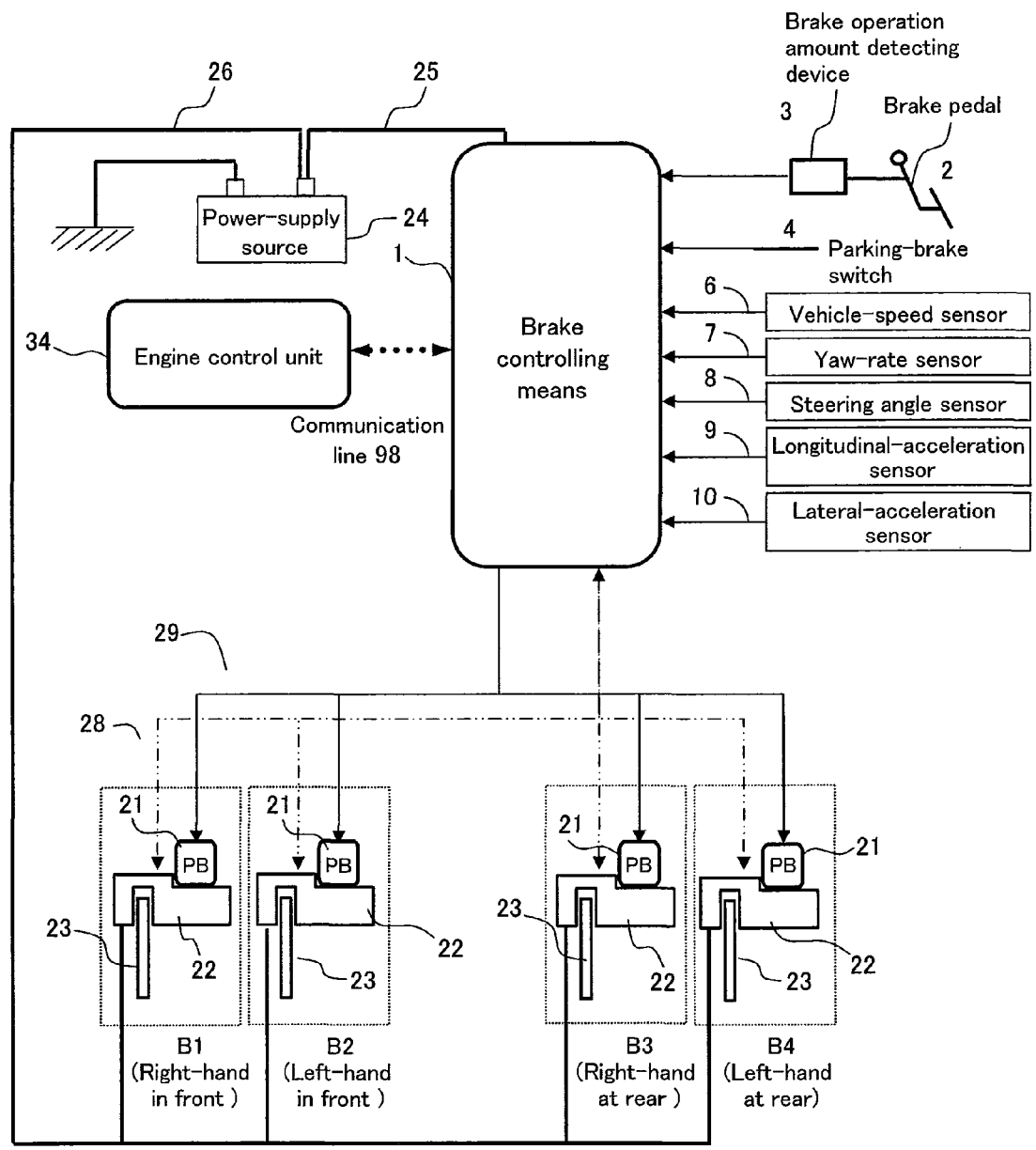
FIG. 8 schematically illustrates a system configuration of an electric brake control system according to the fourth embodiment of the present invention.

FIG. 8 schematically illustrates the configuration of a system including the brake control apparatus 1, the electric brake units B1 to B4 of the wheels W1 to W4, and signal lines and electric-power lines connected to these members. As described above, the brake control apparatus 1 is configured to receive various kinds of sensor information transmitted from such sensors as: the braking operation amount detecting device 3 to detect the amount of the driver's operation on a brake pedal 2; the wheel-speed sensors 6 to detect the speed of the wheels of the vehicle; the yaw-rate sensor 7 to detect the yaw rate of the vehicle; the steering-angle sensor 8 to detect the steering angle of the vehicle; the longitudinal-acceleration sensor 9 to detect the acceleration in the front-to-rear direction of the vehicle; and the lateral-acceleration sensor 10 to detect the acceleration in the side-to-side direction of the vehicle. The brake control apparatus 1 is connected to a communication line 98, so that the brake control apparatus 1 can exchange information, if necessary, with other control units, such for example as an engine control unit. A CAN or the like is a possible means for implementing the function of the communication line 98.

Each of the electric brake units B1 to B4 of the wheels W1 to W4 includes: a member to be braked 23; a braking member (not illustrated); and an electric brake actuator 22. The member to be braked 23 is attached to and rotates together with the corresponding one of the wheels W1 to W4. The electric brake actuator 22 presses the braking member onto the member to be braked 23 by use of a force generated by a motor. A brake disc and a brake drum are some examples of the member to be braked 23. A brake pad is an example of the braking member. The electric brake actuator 22 used here is a known one, and the structure thereof is disclosed in, for example, Japanese Patent Application Publication No. 2002-213507, but is not limited to that. Rather, electric brake actuators of various different structures may be used. For the purpose of generating the braking forces in the wheels W1 to W4, the electric brake units B1 to B4 use a force (thrust) by which the electric brake actuators 22 presses their respective members to be braked 23.

A communication line 28 is provided to connect the brake control apparatus 1 and each of the electric brake units B1 to B4. Via this communication line, the brake control apparatus 1 transmits control signals to control each of the electric brake units B1 to B4 whereas each of the electric brake units B1 to B4 transmits information on the thrust, the current value, and the like of the electric brake actuator 22. The function of the communication line 28 is achieved by a CAN or the like. An electric-power line 26 is connected to each of the electric brake actuators 22 to supply electric power from a power-supply source 24.

In addition, the electric brake control system of the fourth embodiment has a parking-brake function. The brake control apparatus 1 receives a signal from a parking-brake switch 4. The electric brake units B1 to B4 of the wheels W1 to W4 are provided respectively with parking-brake mechanism units 21, each of which restricts either the movement of the brake pad or the action of the electric brake actuator 22 according to commands from the outside. Thus, the braking thrust (the force with which the braking member is pressed onto the member to be braked 23) of the electric brake actuator 22 can be maintained even after the energization of the electric brake actuator 22 is ceased.

A signal line 29 is connected to each parking-brake mechanism unit 21. The command signals from the brake control apparatus 1 is inputted into the parking-brake mechanism units 21 via the signal lines 29. When the parking-brake switch 4 is turned on, the brake control apparatus 1 makes the electric brake actuators 22 operate, so that braking thrust is generated. Then, once the braking thrust is generated, the brake control apparatus 1 sends a command to each of the parking-brake mechanism units 21. Upon receiving the command, each parking-brake mechanism unit 21 operates to keep the braking thrust.

Figure 9:
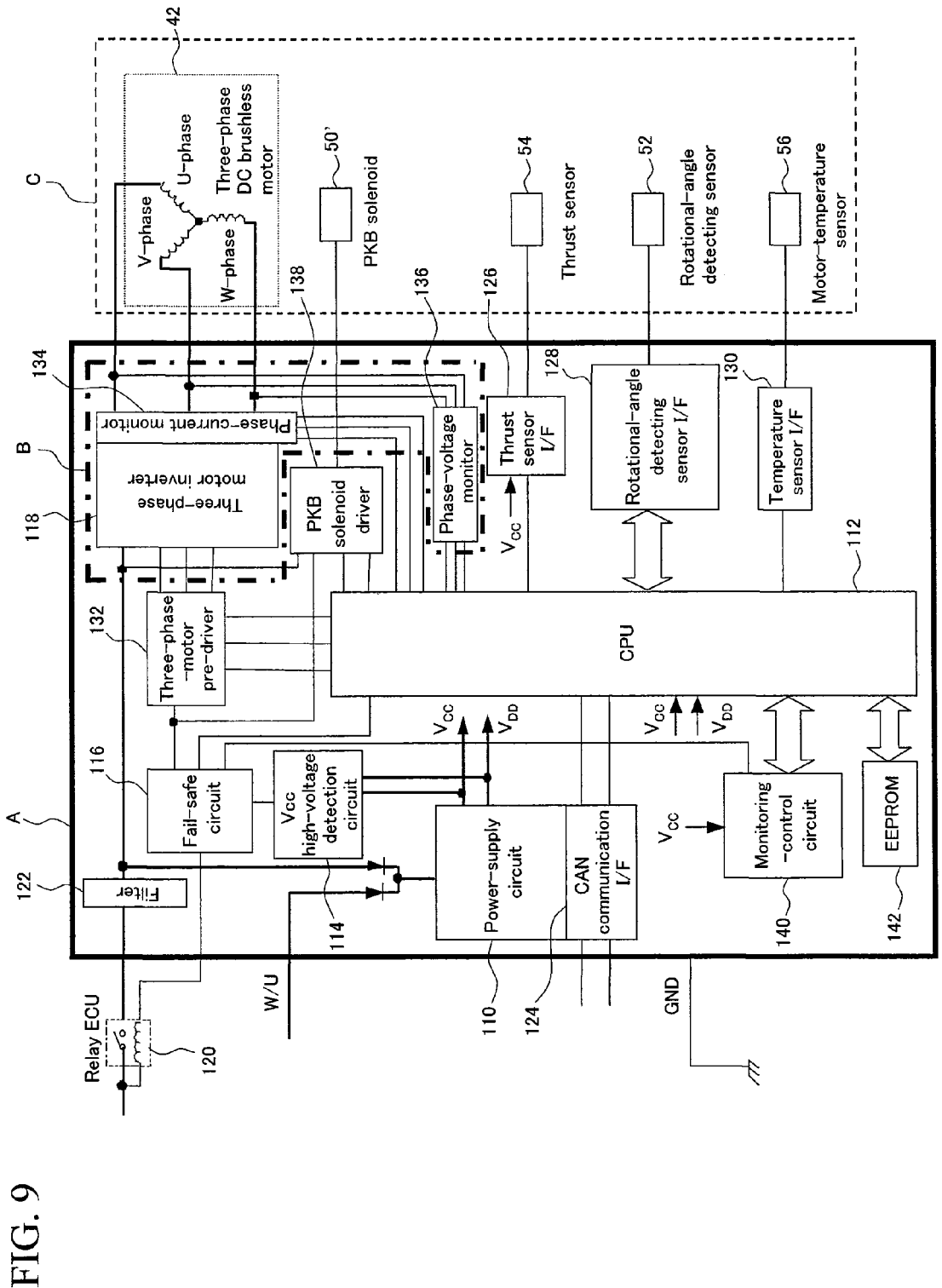
FIG. 9 schematically illustrates a circuit configuration of a brake control apparatus according to the fourth embodiment of the present invention.

FIG. 9 schematically illustrates a circuit configuration of the brake control apparatus 1 of the fourth embodiment. In the circuit of a driving circuit portion DCP (the portion demarcated by the thick solid line A), the electric power supplied via a power-supply line PWL in the vehicle is inputted into a power-supply circuit 110. A stable power-supply voltage (Vcc, Vdd) is obtained by the power-supply circuit 110, and then is supplied to a central control circuit (CPU) 112. In addition, the power-supply voltage (Vcc, Vdd) from the power-supply circuit 110 is detected by a Vcc high-voltage detection circuit 114. If the Vcc high-voltage detection circuit 114 detects a voltage that is higher than a predetermined value, a fail-safe circuit 116 is caused to operate. Note that two different power-supply voltages (Vcc,Vdd) are set in the fourth embodiment, but such a setting is not the only possible setting. Either a single power-supply voltage or more than two different power-supply voltages may be set, instead.

This fail-safe circuit 116 causes a relay control circuit 120 to operate, a relay control circuit 120 switching the electric power supplied to a three-phase-motor inverter circuit 118. If the Vcc high-voltage detection circuit 114 detects a voltage that is higher than a predetermined value, the relay control circuit 120 shuts off the supply of the electric power. By passing through a filter circuit 122, noise in the electric power supplied through the relay control circuit 120 is removed before the electric power is supplied to the three-phase-motor inverter circuit 118.

The central control circuit 112 receives control signals transmitted from the brake control apparatus 1 (see FIG. 8) via a CAN communication interface circuit 124, and also receives output signals transmitted from thrust sensors 54, rotational-angle detection sensors 52, and motor-temperature sensors 56 respectively via a thrust-sensor interface circuit 126, a rotational-angle detection-sensor interface circuit 128, and a motor-temperature-sensor interface circuit 130. These sensors are disposed on the caliper side of each of the electric brake units B1 to B4.

The central control circuit 112 receives information on, for example, the current state of an electric motor 42, and performs a feed-back control on the electric motor 42 in response to control signals from the brake control apparatus 1 so that an appropriate thrust can be obtained. Specifically, on the basis of the control signals from the brake control apparatus 1 and the values detected by the sensors, the central control circuit 112 makes a three-phase-motor pre-driver circuit 132 output appropriate signals and controls the three-phase motor inverter circuit 118 with the signals outputted from the three-phase motor inverter circuit 118. In this case, the three-phase-motor inverter circuit 118 is provided with a phase-current monitor circuit 134 and a phase-voltage monitor circuit 136. The three-phase-motor inverter circuit 118 monitors the phase current and the phase voltage by use of the phase-current monitor circuit 134 and the phase-voltage monitor circuit 136. The outputs of these monitor circuits are inputted into the central control circuit 112, which then makes the three-phase-motor pre-driver circuit 132 operate appropriately. The three-phase motor inverter circuit 118 is connected to the electric motor 42 provided in the caliper of each of the electric brake units B1 to B4 so that the electric motor 42 can be driven in accordance with the control performed by the central control circuit 112.

In addition, on the basis of the control signals from the brake control apparatus 1, the values detected by the sensors, and the like, the central control circuit 112 makes a parking-brake (PKB) solenoid driver circuit 138 operate a PKB solenoid 50' in a driving mechanism portion DMP so as to perform the parking brake. Note that the PKB solenoid driver circuit 138 is supplied with the same electric power as that supplied to the three-phase motor inverter circuit 118.

In addition, the driving circuit portion DCP includes a monitoring-control circuit 140 that exchanges signals with the central control circuit 112 and a memory circuit 142 made of an EEPROM in which information on malfunction and the like is stored. To obtain appropriate thrust, the central control circuit 112 controls the driving of the electric motor 42 on the basis of the information acquired from the monitoring-control circuit 140 and from the memory circuit 142.

Figure 10:
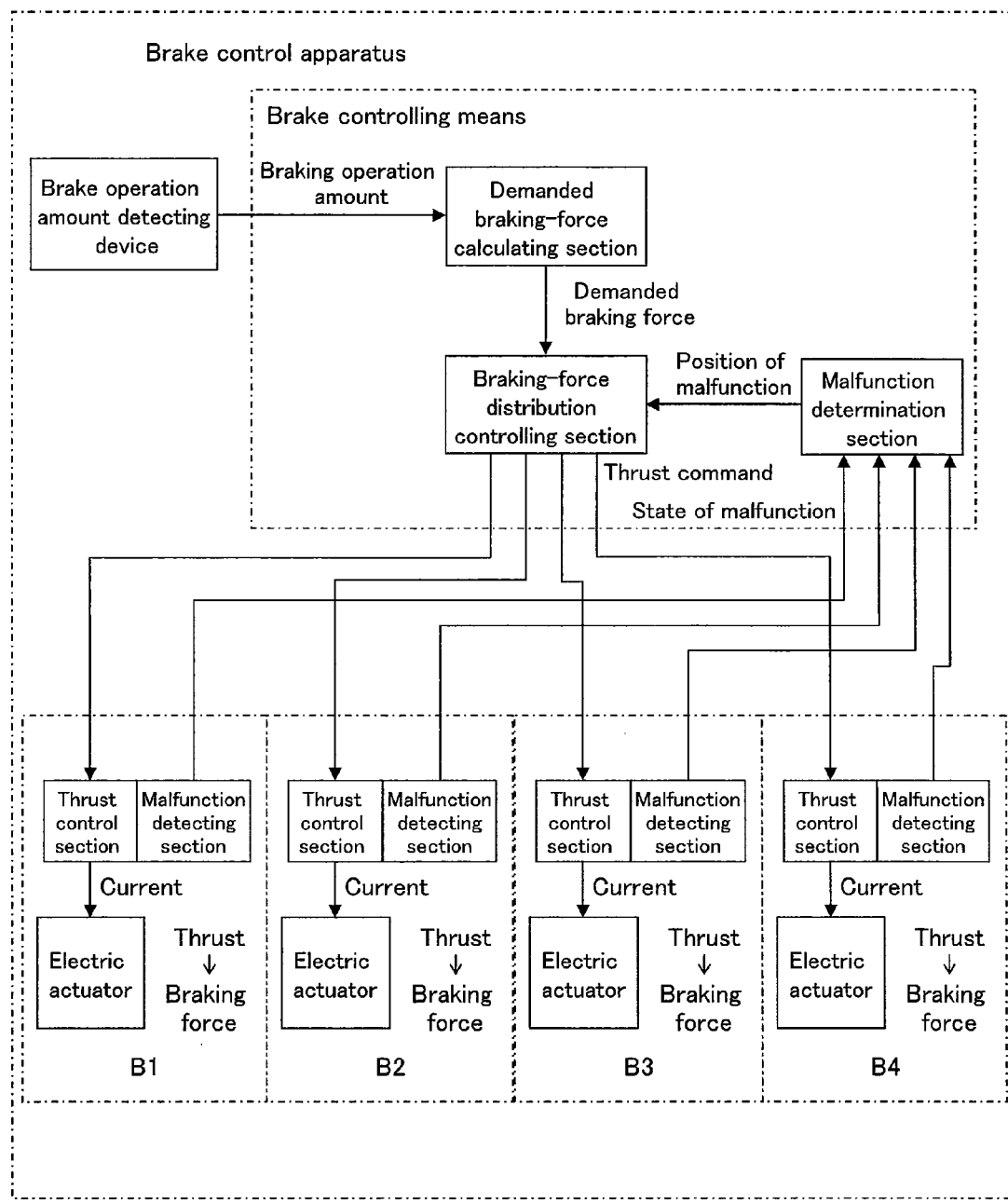
FIG. 10 is a block diagram illustrating a control flow of the brake control apparatus according to the fourth embodiment of the present invention.

FIG. 10 is a block diagram illustrating a control flow of the brake control apparatus 1 of the fourth embodiment. On the basis of the amount of braking operation detected by the braking operation amount detecting device 3, the demanded-braking force calculating section calculates the braking force demanded by the driver. On the basis of the information on malfunction provided by malfunction detecting sections of their respective electric brake units B1 to B4, the malfunction determination section determines in which one of the wheels W1 to W4 a braking malfunction has occurred. On the basis of the result of the determination by the malfunction determination section as to where the malfunction has occurred, the braking-force distribution controlling section distributes the calculated demanded braking force to the wheels W1 to W4 in such a way that each distributed braking force becomes equivalent to the target braking force to be generated in the corresponding wheel. The demanded braking force is thus divided into the target braking forces to be generated respectively in the wheels W1 to W4. Then, the braking-force distribution controlling section converts the wheels' target braking forces respectively to command values each of which represents the thrust to be generated by the corresponding one of the electric brake units B1 to B4 in the wheels W1 to W4.

Each of the electric brake units B1 to B4 includes a thrust-controlling section. On the basis of the command value of thrust received from the braking-force distribution controlling section, the thrust-controlling section controls the electric brake actuator 22 of each wheel so that a braking force can be generated. In addition, the malfunction detecting section of each of the electric brake units B1 to B4 refers both to the command value of thrust and to the actual thrust detected by the thrust sensor 54 provided in the corresponding electric brake actuator 22. By comparing the command value of thrust and the actual thrust, the malfunction detecting section determines whether the corresponding one of the electric brake units B1 to B4 is malfunctioning. Specifically, it is determined that the electric brake unit is malfunctioning, if, for example, the difference between the command value of thrust and the actual thrust is larger than a predetermined amount, or if the difference between the command value of thrust and the actual thrust stays larger than a predetermined amount for a predetermined period of time. The above-described configuration makes it possible to individually detect the malfunctioning of the electric brake actuators 22.

In an alternative configuration, to directly detect various kinds of malfunctioning, the information from various voltage detecting sections and various current detecting sections may be inputted into the malfunction detecting section. For example, to detect malfunctioning of the electric brake actuator 22 caused by, for example, a disconnection or a poor connection of the signal line 28, a disconnection or a poor connection of the electric-power line 26, or a voltage drop or malfunctioning of a power-supply source 28, the malfunction detecting section monitors the values from various voltage detecting sections and current detecting sections.

Descriptions will be given below as to the operations, the switching of the control modes, and the advantageous effects of the brake control systems of the first to the fourth embodiments.

Figure 11:
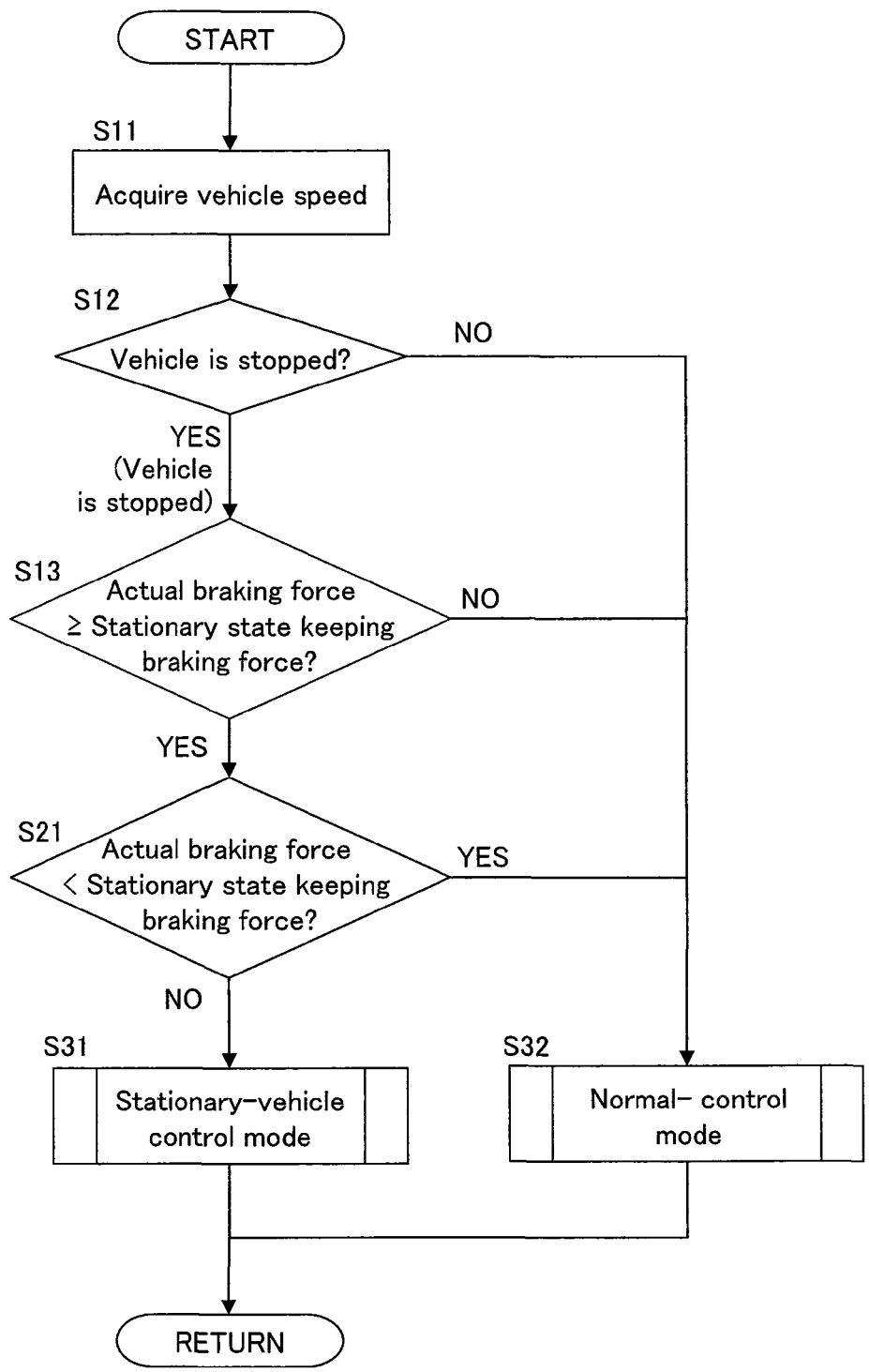
FIG. 11 is an example of a flowchart illustrating an operational procedure related to logic of switching control modes according to the present invention.

FIG. 11 is an example of a flowchart illustrating the logic of switching control modes according to the present invention. At step S11, the brake control system acquires the vehicle speed detected by the vehicle-speed sensor. If the brake control system does not receive signals directly from the vehicle-speed sensor, the brake control system may acquire, via a communication means such as CAN, information on the vehicle speed used by other apparatuses such as the AT controller and the meter unit.

Subsequently, a vehicle-stop determination is executed at step S12. That is, whether the vehicle is or is not been stopped completely is determined. In this determination, if the vehicle speed acquired at step S11 continues to be zero for a predetermined length of time, then it is determined that the vehicle is stopped completely. Alternatively, if the vehicle speed continues to be zero for a predetermined length of time, and, additionally, if a state in which the longitudinal acceleration is within a predetermined range continues to be detected for a predetermined length of time, then it may be determined that the vehicle is stopped completely. If the determination result of the vehicle-stop determination at step S12 is NO, that is, if it is not determined that the vehicle is stopped completely, then a normal control mode of step S32 is selected.

In the normal control mode of step S32, the brake control apparatus continues to function in a conventional manner (continues to play its conventional roles). Specifically, the brake control apparatus executes a brake control operation while using the braking force demanded by the driver as the target braking force to be generated by the brake control apparatus, the braking force demanded by the driver being calculated on the basis of the braking operation amount detected by the braking operation amount detecting device or on the basis of the master-cylinder pressure detected by the master-cylinder pressure sensor. Transition from the normal control mode to a stationary-vehicle control mode is not possible if it is not determined at step S12 that the vehicle is stopped completely. In contrast, it is possible to immediately switch from the stationary-vehicle control mode to the normal control mode if it is determined that the vehicle is stopped completely and if the vehicle in the stationary-vehicle control mode is moved by an external force, such as strong wind.

If it is determined in the vehicle-stop determination at step S12 that the vehicle is stopped completely, then whether the actual braking force is or is not larger than a stationary state keeping braking force, is determined at step S13. The stationary state keeping braking force herein means is a braking force required for maintaining the vehicle in a stationary state. The stationary state keeping braking force may be set either at a value that has been obtained beforehand by carrying out, for example, an experiment, or at a fixed value obtained on the basis of the specifications of the vehicle and desired conditions for stopping the vehicle. Alternatively, the stationary state keeping braking force may be set as a variable defined by either acquiring directly by sensors or just estimating the weight of the vehicle and the angle of the inclination of the ground.

If the result of the determination at step S13 is NO, that is, if it is not determined that the actual braking force is larger than the stationary state keeping braking force, then the normal control mode of S31 is selected. In contrast, if the result of the determination at step S13 is YES, that is, if the actual braking force is larger than the stationary state keeping braking force, then whether the braking force demanded by the driver is or is not smaller than the stationary state keeping braking force is determined at step S21. If the result of the determination at step S21 is YES, that is, if it is determined at step S21 that the demanded braking force is smaller than the stationary state keeping braking force, then the normal control mode of step S32 is selected. Conversely, if the result of the determination at step S21 is NO, that is, if it is not determined at step S21 that the demanded braking force is smaller than the stationary state keeping braking force, the stationary-vehicle control mode of step S31 is selected. In short, step S21 serves as a return condition for shifting from the stationary-vehicle control mode to the normal control mode.

Next, descriptions will be given as to control methods in the stationary-vehicle control mode.

A first method is a method by which the target braking force to be generated by the brake control apparatus is used as the stationary state keeping braking force. According to the first method, the maximum braking force at the vehicle-stop determination is equal to the stationary state keeping braking force. Accordingly, if the demanded braking force is larger than the stationary state keeping braking force, then the braking force to be generated by the brake control apparatus is controlled so as to be limited to the stationary state keeping braking force. If the demanded braking force is equal to or smaller than the stationary state keeping braking force, then the brake control apparatus is controlled so as to generate a braking force that is as large as the demanded braking force.

A second method is a method by which a limit is imposed on the current for driving the motor. The motor drive current is limited to a value that is necessary for keeping the stationary state keeping braking force constant. According to the second method, the maximum motor drive current at the vehicle-stop determination is equal to the current that is necessary for keeping the stationary state keeping braking force constant. Consequently, the wasteful electric-power consumption and heat generation can be reduced directly.

In the logic of switching the control modes of the brake control apparatus that is illustrated in FIG. 11, the set value for the stationary state keeping braking force that is used in comparison at step S13 with the actual braking force (such a set value will be referred to as a "first set value") may be set smaller than the set value for the stationary state keeping braking force that is used for the comparison at step S21 with the demanded braking force (such a set value will be referred to as a "second set value"). With this setting of the values, if the demanded braking force is between the first and the second set values, then the target braking force generated by the brake control apparatus may be fixed as the first set value.

With this setting, if the demanded braking force has a constant value between the first and the second set values for the stationary state keeping braking force, then the target braking force becomes larger than the demanded braking force. Accordingly, the difference between the first set value and the demanded braking force is wasteful consumption of the electric power. Here, suppose a case in which the demanded braking force increases and decreases rapidly and repeatedly between the first and the second set values for the stationary state keeping braking force. In this case, though following the rapidly changing target braking force would otherwise result in a wasteful consumption of the motor drive current, the above-described setting brings about a reduction in the wasteful consumption of the motor drive current. Such setting is effective especially for the brake control apparatus of the third embodiment to reduce the wasteful electric-power consumption for the following reason. The brake control apparatus of the third embodiment generates the braking force by use of the accumulator as the source of the hydraulic pressure, and the compressing of the accumulator consumes motor current. The electric-power consumption necessary for keeping the braking force constant is not very large, but even a small braking force, if increasing and decreasing frequently, needs a large electric-power consumption.

Descriptions have been given thus far as to the logic of switching the control modes and as to the control modes. In the brake control apparatus of the first embodiment, the master-cylinder pressure generated by the brake control operation influences, via the brake pedal, the driver's depressing force on the brake pedal. For this reason, at each of step S12, step S13, and step S21 shown in FIG. 11, it is preferable that, when the control mode is switched from the stationary-vehicle control mode to the normal control mode, the switching of the control modes be executed in a gradual manner by, for example, restricting the possible range of the rate of changing in the target braking force or the motor drive current. In the brake control apparatus of the first embodiment, the use of such restriction prevents a rapid change in the reactive force acting on the brake pedal depressed by the driver from occurring, the rapid change being otherwise caused by a rapidly changing master-cylinder pressure, which is caused by a rapid change in the demanded braking force, the rapid change in the demanded braking force being caused by the mode switching.

Figure 12:
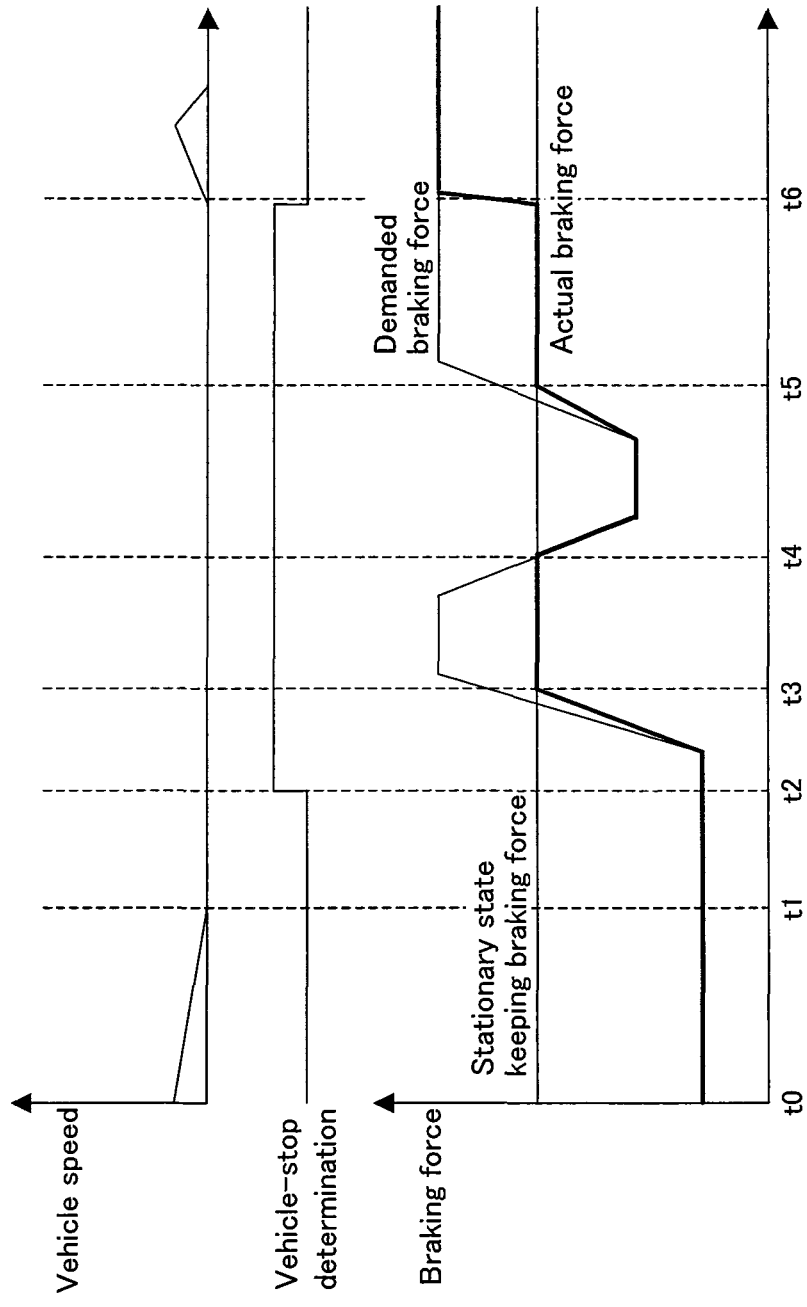
FIG. 12 is a time chart illustrating an example of operation of the brake control apparatus of the present invention.
Figure 13:
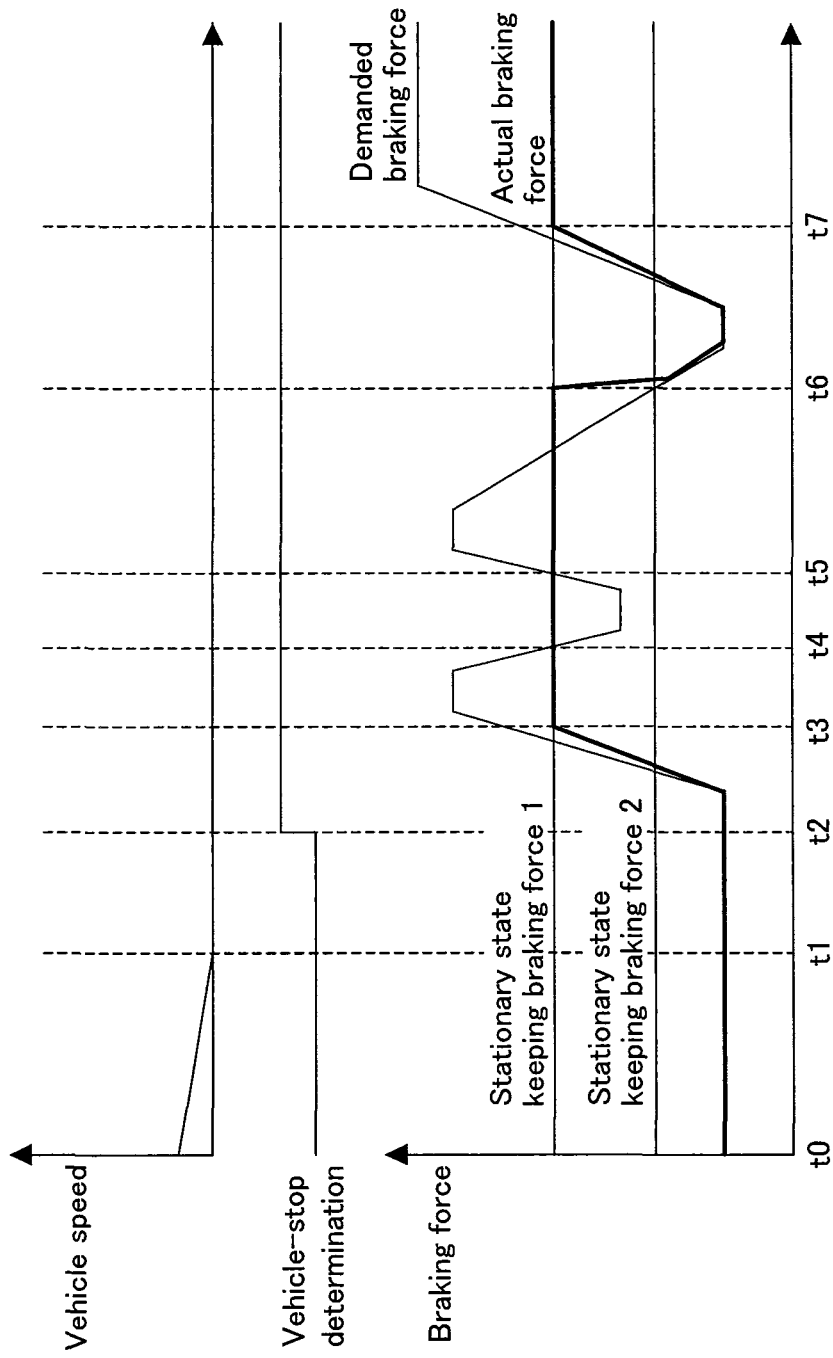
FIG. 13 is a time chart illustrating another example of operation of the brake control apparatus of the present invention.
Figure 14:
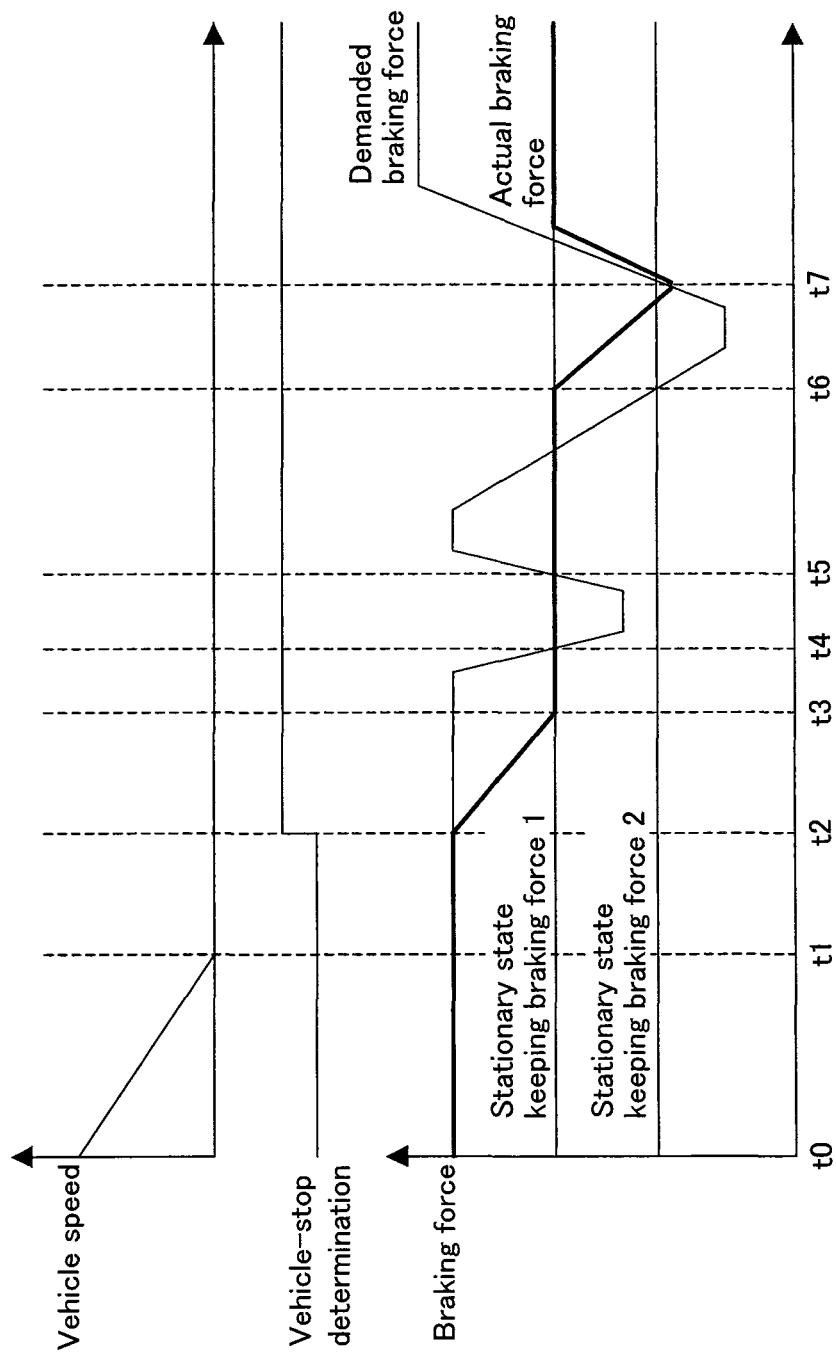
FIG. 14 is a time chart illustrating a still another example of operation of the brake control apparatus of the present invention.

FIGS. 12 to 14 are time charts each of which illustrates an example of operation of the brake control apparatus employing the logic of switching the control modes of the brake control apparatus shown in FIG. 11 when the stationary-vehicle control mode is implemented according to the first control method. Note that, when various braking forces are compared in the logic of switching the control modes, an electric signal corresponding to the amount of the braking operation by the driver is used as the demanded braking force, an electric signal corresponding to either the hydraulic pressure to be generated or the force generated by the actuator is used as the actual braking force, and an electric signal corresponding to the actual braking force generated while the vehicle is stationary as the stationary state keeping braking force.

FIRST EXAMPLE

FIG. 12 is a time chart illustrating an example of the operation of the brake control apparatus of the present invention. The operation shown in FIG. 12 is of a case where only a single set value is given for the stationary state keeping braking force and the braking force applied while the vehicle is not moving is not as large as the stationary state keeping braking force. What is shown for the period from the time t0 till the time t1 is the braking operation of a running vehicle until it becomes stationary. Since a certain braking force is generated, the vehicle speed slows down. The vehicle speed becomes zero at the time t1, so that the vehicle becomes stationary. The control mode during this period is the normal control mode. The control is based on the setting that the braking force demanded by the driver is used as the target braking force of the brake control apparatus, so that the actual braking force is equal to the demanded braking force.

Subsequently, at the time t2, it is determined that the vehicle is stopped completely. The period from the time t1 to the time t2 represents a determination period which is the time needed to determine, at the vehicle-stop determination executed at step S12 in FIG. 11, that the vehicle is stopped completely. Though the vehicle-stop determination is made at the time t2, the actual braking force is still smaller than the stationary state keeping braking force at the time of step S13 in FIG. 11, so that the switching to the stationary-vehicle control mode does not take place at this time. When the actual braking force reaches the level of the stationary state keeping braking force at the time t3, the control mode is switched to the stationary-vehicle control mode. Accordingly, the stationary state keeping braking force starts to be used as the target braking force of the brake control apparatus at the time t3, so that the actual braking force is equal to the stationary state keeping braking force after the time t3.

Next, suppose a case where the demanded braking force becomes smaller than the stationary state keeping braking force at the time t4. In this case, the control mode is switched from the stationary-vehicle control mode to the normal control mode at step S21 in FIG. 11, and thus the braking force demanded by the driver starts to be used again as the target braking force of the brake control apparatus. Accordingly, the actual braking force is equal to the demanded braking force after the time t4. After that, when the actual braking force reaches the level of the stationary state keeping braking force at the time t5, the control mode is switched from the normal control mode to the stationary-vehicle control mode at step S13 in FIG. 11. Accordingly, the stationary state keeping braking force starts to be used again as the target braking force of the brake control apparatus, so that the actual braking force is equal to the stationary state keeping braking force after the time t5.

Next, suppose a case where, at the time t6 when the braking control is executed according to the stationary-vehicle control mode, an external force such as a strong wind makes the vehicle start moving, hence causing the vehicle speed to exceed zero. In this case, it is determined that the vehicle is not stopped completely at the vehicle-stop determination of step S12 in FIG. 11, so that the control mode is switched from the stationary-vehicle control mode to the normal control mode. Accordingly, the target braking force of the brake control apparatus is switched from the stationary state keeping braking force to the braking force demanded by the driver. Consequently, the braking control is executed so as to make the actual braking force follow the demanded braking force. For this reason, in the event that the vehicle in the stationary-vehicle mode starts moving, a braking force larger than the stationary state keeping braking force can be generated by the driver's action to increase the braking operation amount.

SECOND EXAMPLE

Next, by referring FIG. 13, descriptions will be given below as to operations according to a logic of switching the control modes in a case where: the first set value of the stationary state keeping braking force used in the comparison with the actual braking force at step S13 in FIG. 11 (hereinafter the first set value will be referred to as the "stationary state keeping braking force 1") is set larger than the second set value of the stationary state keeping braking force used in the comparison with the demanded braking force at step S21 (hereinafter the second set value will be referred to as the "stationary state keeping braking force 2"); the stationary state keeping braking force 1 is used as the stationary state keeping braking force used in a first control method according to the stationary-vehicle control mode; and the braking force at the vehicle-stop determination has not reached the stationary state keeping braking force. Note that the operation from the time t0 to the time t3 is the same as that shown in FIG. 12, and thus descriptions thereof will be omitted.

When the actual braking force reaches the stationary state keeping braking force 1 at the time t3, the operational flow proceeds from step S13 to step S21. The stationary-vehicle control mode starts to be used as the control mode from step S21 onwards, so that the actual braking force is equal to the stationary state keeping braking force 1 from that time onwards.

Subsequently, the demanded braking force reaches the stationary state keeping braking force 1 at the time t4, and then is lowered down further. Remember that the control mode is switched from the stationary-vehicle control mode to the normal control mode at step S21 in FIG. 11 when the demanded braking force becomes smaller than the stationary state keeping braking force 2. Accordingly, no switching occurs at the time t4. The stationary-vehicle control mode continues to be used, so that the actual braking force is kept at the level of the stationary state keeping braking force 1. In this state, even if the demanded braking force becomes larger than the stationary state keeping braking force 1 again at the time t5, the stationary-vehicle control mode still continues to be used.

Subsequently, when the demanded braking force becomes smaller than the stationary state keeping braking force 2 at the time t6, the control mode is switched from the stationary-vehicle control mode to the normal control mode at step S21 in FIG. 11, so that the target braking force of the brake control apparatus is switched from the stationary state keeping braking force 1 to the braking force demanded by the driver. Accordingly, the actual braking force is controlled to follow the demanded braking force from the time t6 onwards. Note that FIG. 13 also illustrates the fact that there is a slight delay when the actual braking force follows the demanded braking force from the time t6 onwards. Then, when the actual braking force reaches the stationary state keeping braking force 1 at the time t7, the control mode is switched from the normal control mode to the stationary-vehicle control mode again at step S21, and the stationary state keeping braking force 1 starts to be used as the target braking force of the brake control apparatus. Accordingly, the actual braking force is equal to the stationary state keeping braking force 1 from the time t7 onwards.

According to the logic of switching the control modes that has been described thus far by referring FIG. 13, after the vehicle-stop determination, when the actual braking force reaches or exceeds the stationary state keeping braking force 1, the control mode is switched to the stationary-vehicle control mode. While the demanded braking force is larger than the stationary state keeping braking force 2, the actual braking force is constantly equal to the stationary state keeping braking force 1 irrespective of the driver's operation on the pedal, and the stationary-vehicle control mode continues to be used. Then, when the demanded braking force becomes smaller than the stationary state keeping braking force 2, the control mode is switched from the stationary-vehicle control mode to the normal control mode, and the actual braking force is controlled using the braking force demanded by the driver as the target braking force. In addition, though not illustrated in FIG. 13, a non-zero vehicle speed marked during the stationary-vehicle control mode makes the control mode switch to the normal control mode as in the example shown in FIG. 12, and the actual braking force is controlled using the braking force demanded by the driver as the target braking force.

THIRD EXAMPLE

Next, by referring FIG. 14, descriptions will be given below as to operations according to a logic of switching the control modes in a case where: the stationary state keeping braking force 1 used in the comparison with the actual braking force at step S13 in FIG. 11 is set larger than the stationary state keeping braking force 2 used in the comparison with the demanded braking force at step S21; and, while the stationary state keeping braking force 1 is used as the stationary state keeping braking force used in a first control method according to the stationary-vehicle control mode (the conditions listed thus far are the same as those in the second example); the switching of the control modes between the normal control mode and the stationary-vehicle control mode is executed in a gradual manner; and the braking force is larger than the stationary state keeping braking force at the vehicle-stop determination.

What is shown for the period from the time t0 till the time t1 is the braking operation of the running vehicle until it becomes stationary. The vehicle speed is slows down and becomes zero at the time t1, so that the vehicle becomes stationary. The control mode during this period is the normal control mode. The control is based on the setting that the braking force demanded by the driver is used as the target braking force of the brake control apparatus, so that the actual braking force follows the demanded braking force.

Subsequently, at the time t2, it is determined that the vehicle is stopped completely. The period from the time t1 to the time t2 represents the determination period needed for the vehicle-stop determination executed at step S12 in FIG. 11. The normal control mode continues to be used during this determination period, and the actual braking force is equal to the demanded braking force.

Since the stationary-vehicle control mode is put off for a later time. When the actual braking force reaches the level of the stationary state keeping braking force at the time t3, the control mode is switched to the stationary-vehicle control mode. Accordingly, the stationary state keeping braking force 1 starts to be used as the target braking force of the brake control apparatus at time t3, so that the actual braking force is equal to the stationary state keeping braking force from the time t3 onwards. The actual braking force is larger than the stationary state keeping braking force 1 at the time t2, so that the control mode is switched from the normal control mode to the stationary-vehicle control mode at step S21 and the stationary state keeping braking force 1 starts to be used as the target braking force of the brake control apparatus. In the Third Embodiment, the control mode is switched gradually between the normal control mode and the stationary-vehicle control mode by, for example, imposing a limit on the changing rate of the target braking force. Accordingly, the target braking force that has followed the demanded braking force cannot be immediately turned to follow the stationary state keeping braking force 1. Rather, the demanded braking force gradually changes over a period from the time t2 to the time t3 until it reaches the level of the stationary state keeping braking force 1. Accordingly, the actual braking force is controlled to change, gradually over the period from the time t2 to the time t3, from the level of the demanded braking force to the level of the stationary state keeping braking force 1. The operation from the time t3 to the time t6 is the same as the operation in the second example (shown in FIG. 13), and thus descriptions thereof will be omitted.

The demanded braking force becomes smaller than the stationary state keeping braking force 2 from the time t6 onwards. Accordingly, the control mode is switched from the stationary-vehicle control mode to the normal control mode at step S21 in FIG. 11, and the target braking force of the brake control apparatus is switched from the stationary state keeping braking force 1 to the braking force demanded by the driver. Note that, as shown in FIG. 14, such measures as the limit imposed on the changing rate of the target braking force are taken in the third example. Thus, the switching from the normal control mode to the stationary-vehicle control mode is executed in the gradual manner. Consequently, the target braking force is not immediately switched from the stationary state keeping braking force 1 to the demanded braking force. Rather, the target braking force gradually changes from the stationary state keeping braking force 1 to the demanded braking force over a certain length of time. In the example shown in FIG. 14, the demanded braking force is raised, so that the target braking force catches up with the demanded braking force at the time t7. For this reason, the actual braking force is controlled to be equal to the demanded braking force from the time t7 onwards. Note that FIG. 14 illustrates the fact that there is a slight delay when the actual braking force follows the demanded braking force.

The descriptions given thus far is based on the assumption that, in the logic of switching the control modes of the brake control apparatus shown in FIG. 11, the conditions used at the determination of step S13 and at the determination of step S21 are defined by comparisons carried out in terms of the braking force. Alternatively, either the hydraulic pressure or the piston thrust in the wheel-cylinder in the brake caliper may be used in place of the braking force. In this case, the wheel-cylinder pressure sensors 60*a* to 60*d* are used as means for detecting the hydraulic pressure in the brake calipers, or thrust sensors are used as means for detecting the piston thrust in the brake calipers. The value of the hydraulic pressure, or the piston thrust, in the brake caliper needed for keeping the vehicle stationary is set in a similar manner to the above-described method of setting the stationary state keeping braking force. In addition, the conditions for the determination at step S13 and the determination at step S21 may be defined by comparing the motor driving current with the current needed for keeping the stationary state keeping braking force constant.

As has been described thus far, as long as it is not determined that the vehicle is stopped completely, or to put it differently, if the vehicle moves even by a slightest amount, the normal control mode is used as the control mode, and the brake control apparatus continues to function in the conventional way (to play the conventional role). If, however, it is determined that the vehicle is stopped completely, the control mode is switched to the stationary-vehicle control mode. In addition, if it is determined that the vehicle is stopped completely, and, at the same time, if the actual braking force is equal to or smaller than the stationary state keeping braking force, the normal control mode is used. In contrast, if the actual braking force reaches or exceeds the stationary state keeping braking force, the control mode is switched to the stationary-vehicle control mode in which the actual braking force is equal to the minimum braking force that is enough to keep the vehicle in a completely stationary state. Moreover, also in a case where the braking force demanded by the driver becomes smaller than the stationary state keeping braking force, the control mode is switched to the normal control mode, and the actual braking force is lowered from the level of the stationary state keeping braking force down to the level of the demanded braking force. In this way, the wasteful electric-power consumption and heat generation while the vehicle is not moving can be reduced. In addition, the vehicle can start moving smoothly. Moreover, it is possible to achieve the brake control that can prevent the vehicle from behaving against the driver's intention when the start and the stop of the vehicle are switched.

FOURTH EXAMPLE

In the above-described three examples, even if the driver further depresses the brake pedal during operation in the stationary-vehicle control mode, the braking force does not increase. In the fourth example described below, however, the braking force can be increased if, for some reasons, the driver further depresses the brake pedal by an amount that is larger than a predetermined value. In addition, in the fourth example, the logic of switching the control modes includes prohibition of the further depression of the brake pedal.

Figure 15:
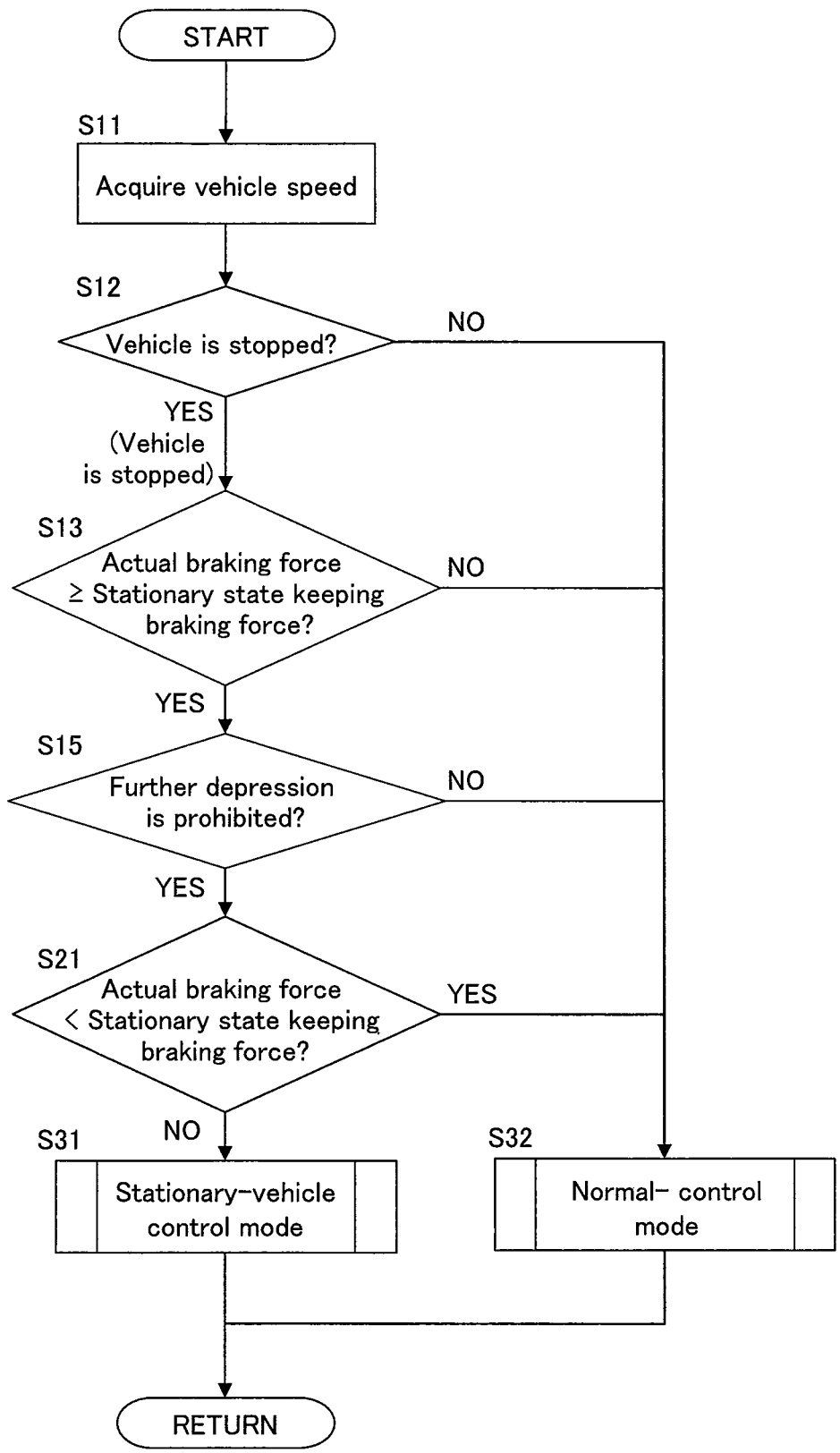
FIG. 15 is a flowchart illustrating an example of operational procedure according to the control modes of the present invention to which a switching logic to increase the braking force when the driver further depresses the brake pedal is added.
Figure 16:
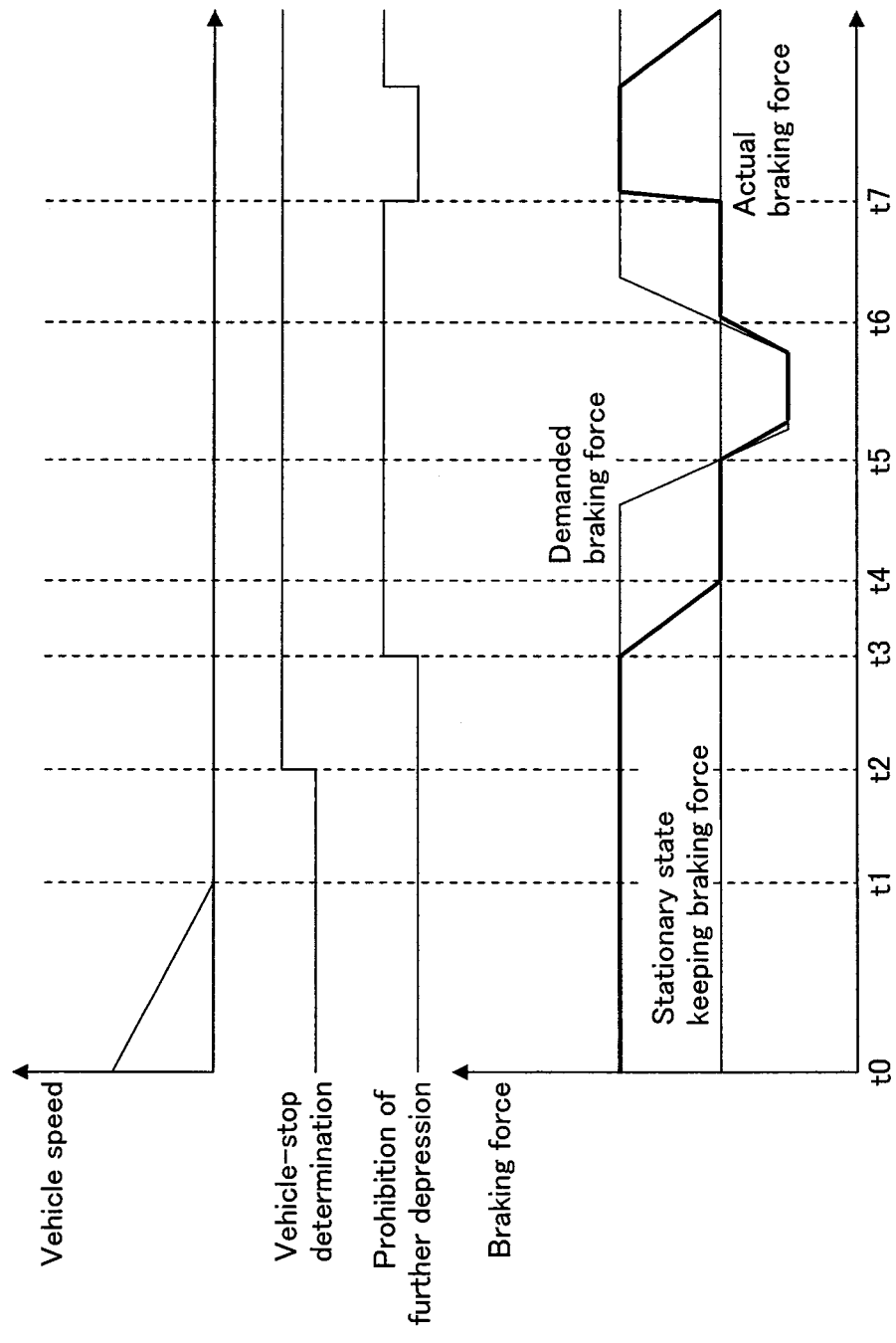
FIG. 16 is a time chart illustrating an example of operation of the brake control apparatus of the present invention to which the operational procedure illustrated in the flowchart of FIG. 15 is applied.

FIG. 15 is a flowchart illustrating an operational procedure of the brake control apparatus of the fourth example. FIG. 16 is a time chart of a case where the operational procedure of FIG. 15 is employed. The flowchart of FIG. 15 is characterized in that a step of determining whether the further depression of the brake pedal is or is not prohibited is interposed between step S13 and step S21 of the flowchart shown in FIG. 11.

The prohibition on the further depression of the brake pedal is determined if such a condition as the following is met: 1) a braking force exceeding a predetermined value continues to be generated for a predetermined length of time or longer, or 2) the temperature of either a motor or a motor driving element exceeds a predetermined value. In addition, the prohibition may be removed if a state where a braking force that is not as large as a predetermined value continues to be generated for a predetermined length of time or longer. Note that the determination conditions are not limited to these. For example, the prohibition may be imposed on condition that: 1) the value obtained through the time integral of the braking force that is larger than a predetermined value exceeds a predetermined value; or 2) the value obtained through the time integral of the temperature of either a motor or a motor driving element that is higher than a predetermined value exceeds a predetermined value. In addition, the prohibition may be removed if the value obtained through the time integral of a braking force that is equal to or smaller than a predetermined value does not exceed a predetermined value. Still alternatively, the determination conditions may be defined appropriately by taking the specific models of the braking control into consideration.

Suppose a case where it is determined that the vehicle is stopped at the time t2 in FIG. 16, and a state where a braking force that is equal to or larger than a predetermined value continues to be generated for a predetermined length of time until the time t3. Then, the prohibition of the further depression of the brake pedal is turned on at the time t3. When the demanded braking force becomes equal to or larger than the stationary state keeping braking force (NO at step S21 in FIG. 15), the stationary-vehicle control mode start to be used. Then, the actual braking force decreases gently, and reaches the level of the stationary state keeping braking force at the time t4. Thereafter, the actual braking force is kept at the level of the stationary state keeping braking force.

When the demanded braking force becomes smaller than the stationary state keeping braking force at the time t5, YES is selected at step S21, and the control mode is switched to the normal control mode S32. The actual braking force starts to follow the demanded braking force as shown in FIG. 16. When the actual braking force either reaches or exceeds the stationary state keeping braking force at the time t6, YES is selected at the determination of step S13, and the operational flow proceeds to step S15. Furthermore, NO is selected at the determination of step S21, and the control mode is switched to the stationary-vehicle control mode of S31. The actual braking force is kept at the level of the stationary state keeping braking force.

If a braking force that is equal to or smaller than a predetermined value continues to be generated for a predetermined length of time until the time t7, the prohibition of the further depression of the brake pedal is turned off at the time t7. So, NO is selected at the determination of step S15, and the control mode is switched to the normal control mode of S32. The actual braking force thus starts to follow the demanded braking force.

FIFTH EXAMPLE

The operation of the fifth example is characterized by an additional step to the operation of the fourth example. Specifically, in the fifth example, a further-depression braking force is provided, and a step of determining whether the demanded braking force does or does not exceeds the further-depression braking force is added before the step of determining whether the further depressing on the brake pedal is or is not prohibited. In the fifth example, the braking force can be increased if, for some reasons, the driver further depresses the brake pedal by an amount that is larger than a predetermined value. In addition, in the fifth example, the logic of switching the control modes includes prohibition of the further depression of the brake pedal. The determination conditions for the prohibition of the further depression of the brake pedal are the same as those in the fourth example.

Figure 17:
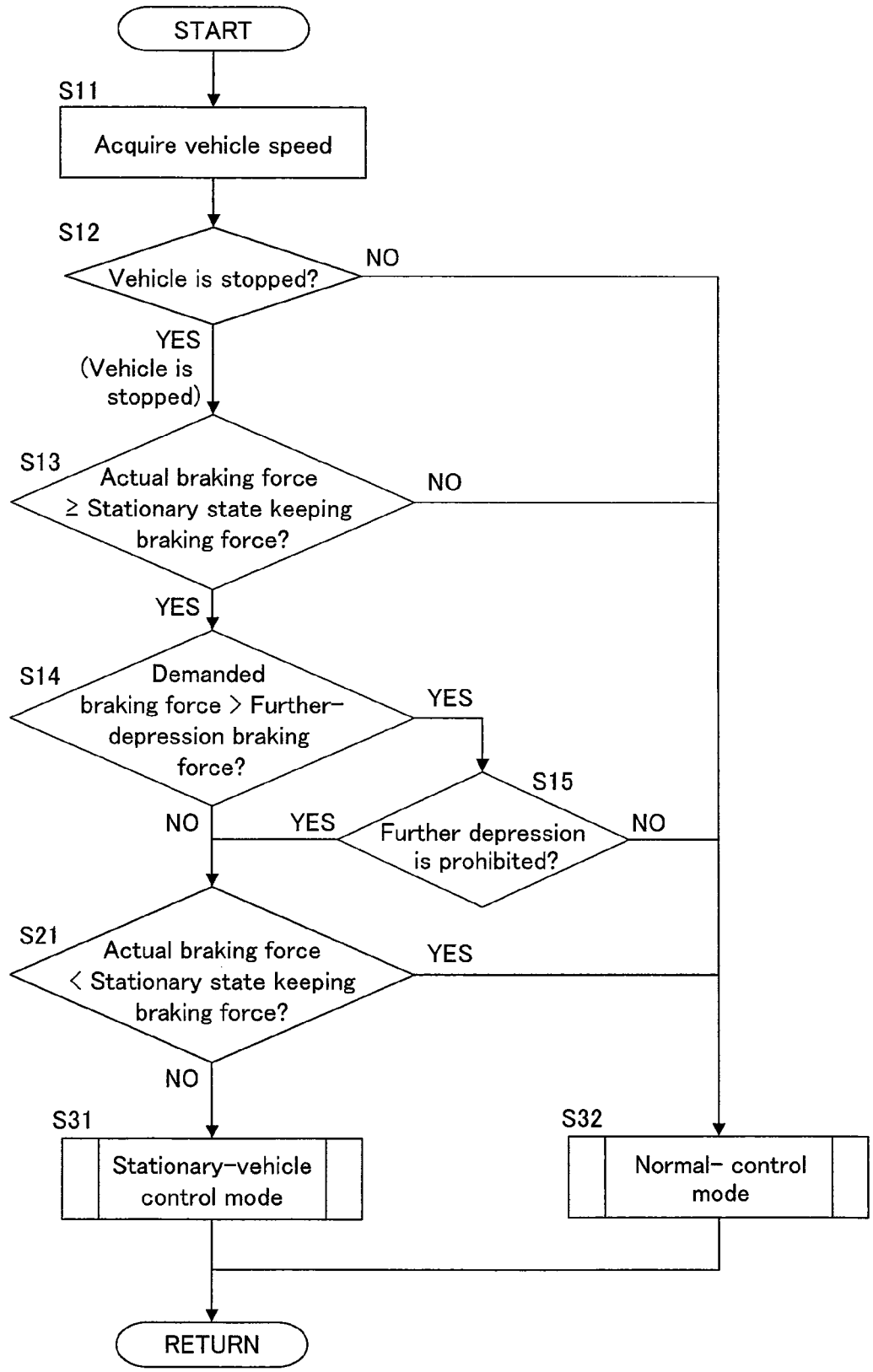
FIG. 17 is a flowchart illustrating another example of operational procedure according to the control modes of the present invention to which the switching logic to increase the braking force when the driver further depresses the brake pedal is added.
Figure 18:
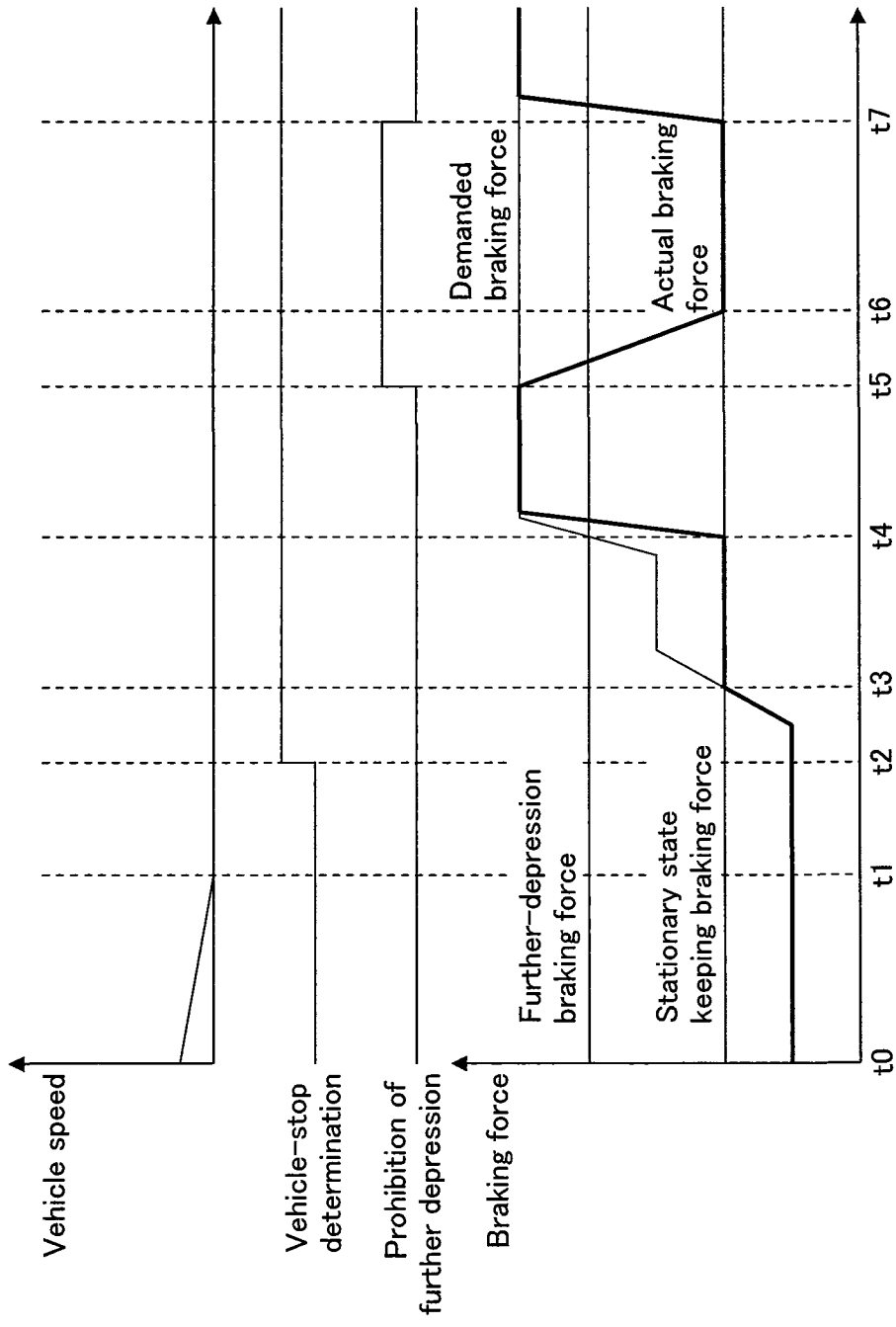
FIG. 18 is a time chart illustrating an example of operation of the brake control apparatus of the present invention to which the operational procedure illustrated in the flowchart of FIG. 17 is applied.

FIG. 17 is a flowchart illustrating an operational procedure of the brake control apparatus of the fifth example. FIG. 18 is an example of a time chart of a case where the operational procedure of FIG. 17 is employed. The operation shown in this example is the operation of a case where the braking force does not reach the level of the stationary state keeping braking force at the vehicle-stop determination.

After the time t2 at which it is determined that the vehicle is stopped (YES at step S12), the actual braking force reaches the level of the stationary state keeping braking force at the time t3. In this case, NO is selected at the determination of step S14, and then NO is selected at the determination of step S21. Consequently, the control mode is switched to the stationary-vehicle control mode of S31. The actual braking force is kept at the level of the stationary state keeping braking force.

Subsequently, if the demanded braking force exceeds the further-depression braking force at the time t4, then YES is selected at the determination of step S14 and the operational flow proceeds to step S15. Since the prohibition of the further depression of the brake pedal is still kept in the off state at the time t4, NO is selected at the determination of step S15, and thus the operational flow proceeds to step S32. Accordingly, the actual braking force starts to follow the demanded braking force.

Subsequently, if a braking force that is equal to or larger than a predetermined value continues to be generated for a predetermined length of time until the time t5, the prohibition of the further depression of the brake pedal is turned on at the time t5. So, result of determination of step S15 is switched to YES, and the operational flow proceeds to step S21 and further proceeds to step S31, where the control mode is switched to the stationary-vehicle control mode. The actual braking force decreases gently and reaches the level of the stationary state keeping braking force at the time t6. From the time t6 onwards, the actual braking force is kept at the level of the stationary state keeping braking force.

Subsequently, if a braking force that is equal to or smaller than a predetermined value continues to be generated for a predetermined length of time until the time t7, the prohibition of the further depression of the brake pedal is turned off at the time t7. So, NO is selected at the determination of step S15, and the control mode is switched to the normal control mode of S32. The actual braking force starts to follow the demanded braking force.

After the driver further depresses the brake pedal once, the further depression of the brake pedal cannot be performed for a predetermined length of time so as to prevent generation of heat in the brake apparatus. Accordingly, the demanded braking force continues to be larger than the stationary state keeping braking force from the time t6 till the time t7, but the actual braking force is kept at the level of the stationary state keeping braking force. Then, since a predetermined length of time has been elapsed since the last action of the further depression of the brake pedal by the time t7, the driver can perform another further depression of the brake pedal.

The brake control apparatus that has been described thus far by referring to the Examples illustrated in FIGS. 15 to 18 is provided with a logic including a determination as to the prohibition of the further depression of the brake pedal and capable of raising the braking force by the further depression of the brake pedal (by an amount that is larger than a predetermined value) performed while the prohibition of the further depression of the brake pedal is turned off. Using the brake control apparatus, the stationary state of the vehicle can be kept even in a case where the stationary state of the vehicle may not be maintained—e.g., in a case where an overloaded vehicle is stopped on a steep slope, or a strong wind is blowing onto the vehicle so as to make the vehicle move downwards on the slope. What is necessary for the driver to keep the vehicle in the stationary state even in the above-mentioned case is to further depress the brake pedal, at the driver's own discretion, before the vehicle starts moving—e.g., before the vehicle speed starts to have a non-zero value or before the acceleration of the vehicle starts to change.

EXPLANATION OF REFERENCE NUMERALS

1 . . . brake control system, 3 . . . master-cylinder pressure controlling device, 4 . . . master-cylinder pressure controlling mechanism, 5 . . . wheel-cylinder pressure controlling device, 6 . . . wheel-cylinder pressure controlling mechanism, 7 . . . input rod, 8 . . . braking operation amount detecting device, 9 . . . master-cylinder, 10 . . . reservoir tank, 11a to 11d . . . wheel-cylinder, 20 . . . drive motor, 21 . . . speed-reduction device, 22 . . . drive pulley, 23 . . . driven pulley, 24 . . . belt, 25 . . . rotation-translation converting device, 26 . . . ball-screw nut, 27 . . . ball-screw shaft, 28 . . . movable member, 29 . . . return spring, 30 . . . transmission member, 40 . . . primary piston, 41 . . . secondary piston, 42 . . . primary fluid chamber, 43 . . . secondary fluid chamber, 50a to 50b . . . gate outlet valve, 51a to 51b . . . gate inlet valve, 52a to 52d . . . inlet valve, 53a to 53d . . . outlet valve, 54a to 54b . . . pump, 55 . . . motor, 56 and 57 . . . master-cylinder pressure sensor, 100 . . . brake pedal, 101a to 101d . . . disc rotor, 102a and 102b . . . master pipe,

What is claimed is:

1. A brake control apparatus for a vehicle configured to detect an amount of brake-pedal operation by means of an electric signal, then to calculate a braking force demanded by a driver from the electric signal, and thereby to generate the demanded braking force, wherein a control mode according to which a braking force is generated by the brake control apparatus is switched from a normal control mode to a stationary-vehicle control mode, if a determination that the vehicle is in a stationary state is followed by another determination that an electric signal corresponding to an actual braking force exceeds a first command value for a stationary-vehicle braking force to be generated while the vehicle is in the stationary state, the control mode according to which the braking force is generated by the brake control apparatus is switched from the stationary-vehicle control mode to the normal control mode, if it is determined that the demanded braking force calculated from the amount of the driver's brake-pedal operation becomes smaller than a second command value for the stationary-vehicle braking force, in the stationary-vehicle control mode, a braking force generated by a means for braking is equal to a single set value for the stationary-vehicle braking force, while in the normal control mode, the braking force generated by the means for braking is equal to the demanded braking force, in the stationary-vehicle control mode, a limit is imposed on a motor driving current of the brake control apparatus, the normal control mode is switched to the stationary-vehicle control mode in a gradual manner, the determination that the vehicle is in the stationary state is made if the vehicle remains in the stationary state for a predetermined length of time, and the first command value and the second command value are the single set value.

2. The brake control apparatus according to claim 1, wherein the determination that the vehicle is in the stationary state is made if the vehicle remains in the stationary sate for a predetermined length of time and, in addition, if a state in which acceleration in a front-to-rear direction is within a predetermined range is detected for a predetermined length of time.

* * * * *